(12) United States Patent
Maguire

(10) Patent No.: US 6,405,949 B1
(45) Date of Patent: Jun. 18, 2002

(54) SHUTTLE GRANULATOR

(76) Inventor: Stephen B. Maguire, 935 Parkersville Rd., West Chester, PA (US) 19382

(*) Notice: Subject to any disclaimer, the term of this patent is extended or adjusted under 35 U.S.C. 154(b) by 0 days.

(21) Appl. No.: 09/287,065

(22) Filed: Apr. 6, 1999

(51) Int. Cl.[7] ............................................. B02C 18/22
(52) U.S. Cl. ........................... 241/30; 241/35; 241/242; 241/280
(58) Field of Search ................. 241/277, 242, 241/243, 152.2, 100, 74, 280, 281, 35, 30

(56) References Cited

U.S. PATENT DOCUMENTS

| | | |
|---|---|---|
| 2,161,190 A | 6/1939 | Paull |
| 3,111,115 A | 11/1963 | Best |
| 3,115,276 A | 12/1963 | Johanningmeier |
| 3,209,898 A | 10/1965 | Bebbe et al. |
| 3,286,745 A * | 11/1966 | Meis .......................... 241/277 |
| 3,348,848 A | 10/1967 | Lucking et al. |
| 3,418,694 A | 12/1968 | Strauss |
| 3,470,994 A | 10/1969 | Schnell et al. |
| 3,959,636 A | 5/1976 | Johnson et al. |
| 3,985,262 A | 10/1976 | Nauta |
| 4,026,442 A | 5/1977 | Orton |
| 4,108,334 A | 8/1978 | Moller |
| 4,148,100 A | 4/1979 | Moller |
| 4,219,136 A | 8/1980 | Williams et al. |
| 4,354,622 A | 10/1982 | Wood |
| 4,402,436 A | 9/1983 | Hellgren |
| 4,412,659 A * | 11/1983 | Crawford et al. ............. 241/35 |
| 4,454,943 A | 6/1984 | Moller |
| 4,475,672 A | 10/1984 | Whitehead |
| 4,498,783 A | 2/1985 | Rudolph |
| 4,525,071 A | 6/1985 | Horowitz et al. |
| 4,545,538 A | 10/1985 | Prew |
| 4,545,539 A | 10/1985 | Steffensen |
| 4,581,704 A | 4/1986 | Mitsukawa |
| 4,705,083 A | 11/1987 | Rossetti |
| 4,756,348 A | 7/1988 | Moller |
| 4,793,711 A | 12/1988 | Ohlson |
| 4,830,508 A | 5/1989 | Higuchi et al. |
| 4,848,534 A | 7/1989 | Sandwall |
| 4,850,703 A | 7/1989 | Hanaoka et al. |
| 5,076,505 A | 12/1991 | Petrocy |
| 5,110,521 A | 5/1992 | Moller |
| 5,116,547 A | 5/1992 | Tsukahara et al. |
| 5,132,897 A | 7/1992 | Allenberg |
| 5,148,943 A | 9/1992 | Moller |
| 5,172,489 A | 12/1992 | Moller |
| 5,195,685 A | 3/1993 | Dumaine |
| 5,225,210 A | 7/1993 | Shimoda |
| 5,226,606 A | 7/1993 | Jasperson et al. |
| 5,261,743 A | 11/1993 | Moller |
| 5,285,930 A | 2/1994 | Nielsen |
| 5,320,293 A | 6/1994 | Laly et al. |
| 5,328,106 A | 7/1994 | Griffin, Jr. |

(List continued on next page.)

FOREIGN PATENT DOCUMENTS

| | | |
|---|---|---|
| DE | 3541532 A1 | 11/1985 |
| DE | 3704725 | 8/1988 |
| DE | 38 08 675 | 10/1989 |
| DE | 3923241 | 1/1991 |
| DE | 41 00 748 | 7/1992 |
| DE | 4105375 | 8/1992 |

(List continued on next page.)

OTHER PUBLICATIONS

Six page brochure entitled "Piovan Gravimetric Blenders MDW" published by Piovan Srl, Oct. 1993, Venezia, Italy.
One page flyer entitled "Gravimix, The New Gravimetric Blending Generation" published by Ferlin, De demsvaard, Holland, circa 1993.

(List continued on next page.)

*Primary Examiner*—Mark Rosenbaum
(74) *Attorney, Agent, or Firm*—Charles N. Quinn

(57) ABSTRACT

Method and apparatus for recycling plastic materials includes the movement of hoppers along cutting edges.

32 Claims, 15 Drawing Sheets

U.S. PATENT DOCUMENTS

| | | |
|---|---|---|
| 5,340,949 A | 8/1994 | Fujimura et al. |
| 5,423,455 A | 6/1995 | Ricciardi et al. |
| 5,651,401 A | 7/1997 | Cados |
| 5,692,686 A | 12/1997 | Moreau |
| 5,767,453 A | 6/1998 | Wakou et al. |
| 5,780,779 A | 7/1998 | Kitamura et al. |
| 5,785,259 A | 7/1998 | Nishibori |
| 5,843,513 A | 12/1998 | Wilke et al. |

FOREIGN PATENT DOCUMENTS

| | | |
|---|---|---|
| DE | 9409906.5 | 6/1994 |
| DE | 4323295 | 2/1995 |
| DE | 4333849 | 3/1995 |
| DE | 4410496 | 9/1995 |
| DE | 29509271 | 10/1995 |
| DE | 4440769 | 5/1996 |
| DE | 29721670 | 12/1997 |
| EP | 0 285 111 | 10/1988 |
| EP | 0318170 | 5/1989 |
| EP | 0507689 | 10/1992 |
| EP | 0587085 | 3/1994 |
| EP | 0 135 356 | 3/1995 |
| EP | 0743149 | 11/1996 |
| FR | 2517087 | 9/1982 |
| GB | 2081687 | 2/1982 |
| GB | 2120969 | 12/1983 |
| GB | 2228690 | 9/1990 |
| GB | 2238965 A | 6/1991 |

OTHER PUBLICATIONS

Four page brochure entitled "When you Weigh it All Up . . ." published by Ferlin Trading, Holland, circa 1993.

Thirty–two page catalog entitled "Maguire Color Blending Experiment" published by Maguire Products, Inc., 1993, United States.

Two page brochure entitled "Mould–Tek Bulk Handling Systems" published by Mould–Tek Industries, Inc. in Canada, circa 1993.

Brochure entitled "Plastic Moulders and Extruders: published by Maguire Products, Inc., 1995".

German Publication Entitled "Anusse and Ausschubteile mit Muhlen wiedererwerten" by H. Kornmayer dated 1990.

European Publication Entitled "Correct Design of Granulators for Injection Moulding Plants," by V. Hess dated 1992.

Sheet of 2 photographs of Mould–Tek gravimetric blender, circa 1993.

Sheet of 2 photographs of Motan gravimetric blender and feeding system with Maguire Products, Inc. controls, circa 1993.

Sheet of 3 photographs of UNA–DYN gravimetric blender, circa 1993.

Sheet of 2 photographs of Maguire Products, Inc. gravimetric blender with Conair hoppers and feeding system, circa 1993.

Sheet of 1 photograph of Hydracolor gravimetric blender, circa 1993.

Advertisement entitled "Machinery and Systems for Extrusion is Our Only Business" by Process Control Corporation, circa 1993.

Advertisement entitled "Weigh Blender Delivers Unmatched Accuracy" by Universal Dynamics, Inc., circa 1993.

Advertisement entitled "A Full Line–up of Blender Solutions . . . Priced Right!" by HydReclaim, circa 1993.

Advertisement entitled "NEW FROM HydReclaim—Now Processors Can Economically Achieve Continuous Gravimetric Blending" by HydReclaim, circa 1993.

Article entitled "Control Loading Systems" from *Plastics Technology*, Oct. 1995, p. 41.

Advertisement "Introducing our 400 VME–II Gravimetric Blender" by HydReclaim Corporation, circa 1993.

Four page brochure entitled "Gravimix Better Quality through Research", circa 1993.

Four page brochure entitled "Conomix Plus Volumetric Blender" dated Aug. 1993.

Four page brochure entitled "Conair Franklin Autocolor Y Mezclador" dated Mar. 1995.

Two–sided flyer entitled "GB 140 Series Compact Auto Weigh Blender" published by Conair Franklin in the United States, Jun., 1994.

Six page brochure entitled "Graviblend Precise Continuous Weigh Blenders" published by Ktron Vertech, Jun., 1991, United States.

"Maschinen und Anlagen zum Zerkleinern und Recyceln von Kunststoffabfällen", Kunststoffberater, 37:70–72 (1992).

Forty–four page two–sided brochure including cover and back pages entitled "Maguire: Auxiliary equipment for the plastics industry" of Maguire Products, Inc., Oct. 2000.

\* cited by examiner

SHUTTLE GRANULATOR

FIELD OF THE INVENTION

This invention relates to reprocessing for recycling of scrap plastic, reprocessing solid thermoplastic waste materials resulting from unsuccessful plastic molding operation and to reprocessing of solid plastic mold runners and sprues produced in the ordinary course of plastic injection or compression molding.

BACKGROUND OF THE INVENTION

The plastics industry uses granulators to recycle discarded solid plastic waste and to recycle scrap materials which are produced incident to the production of injection molded or compression molded plastic products and for recycling defective molded products, where molding has been unsuccessful due to incomplete mold fill or unsatisfactory conditions within the mold.

Many plastic resin materials used in compression and injection molding may be repeatedly melted and formed. Thus, if a molded part is formed incorrectly or the desired shade of color is not obtained, the part can be ground into small particles and processed again.

In addition to scrap and malformed parts, parts are sometimes molded attached to a runner, which is a solid plastic tree connecting together two or more parts produced in separate cavities in the same mold. These runners may also be recycled; manufacturers utilize granulators to do this.

Sprues are solid plastic material resulting from cooling of molten plastic material in one or more passageways between the mold cavities and the point of introduction of molten plastic material into the molding machine.

Granulators are normally selected based on size(s) of plastic parts the granulator must ingest and required maximum throughput of such parts in pounds per hour. In a plastic molding facility there is often one granulator adjacent to every molding press, with the granulator dedicated to grinding and returning to the process defective parts molded on that press as well as runners and sprues resulting in the molding process.

Known granulators employ a reel-type blade assembly similar to that of a reel-type, hand-operated, manually powered lawn mower. Such conventional granulators typically have two heavy side plates with bearings. Connecting these plates are heavy cross bars holding bed knives, which are generally two (2) in number, positioned on opposite sides of the reel axis and oriented parallel to the axis of rotation of the reel. Journaled in the bearings retained by the side plates is a heavy reel which holds three (3) and sometimes five (5) reel knives. Plastic material to be granulated for recycling enters the cutting region perpendicular to the axis of reel rotation.

In known granulators, distance between the side plates may typically be about twelve (12) inches and cutting circle diameter may also typically be about twelve (12) inches. Hence the knives are about twelve (12) inches long. The possibility of having to make a single twelve (12) inch long cut, along the full length of a blade, for one hit on a single chunk of plastic determines required power capacity for the motor, which is typically 5 or 10 horsepower even if gear reduction is used. Flywheels are often utilized to aid the motor in the cutting process.

A screen under the cutting chamber permits only small resulting particles of solid plastic material to escape the turning reel knives as the plastic material churns within the cutting chamber. The cut solid plastic material which has been reduced to small size drops from the bottom of the cutting chamber through holes in the screen, which are typically about one-quarter ($\frac{1}{4}$) inch diameter and can be from one-eighth ($\frac{1}{8}$) inch diameter up to about three-quarters ($\frac{3}{4}$) inch diameter, depending on the size of granules to be produced.

SUMMARY OF THE INVENTION

In one of its aspects, this invention provides apparatus for reducing large pieces of solid plastic material to smaller size for recycling. The apparatus includes a longitudinally elongated table having transversely displaced upper and lower segments. The apparatus further includes a cutter mounted for rotation about an axis between the upper and lower table segments and means for rotating the cutter. A movable hopper receives large size plastic pieces to be reduced in size and has an open bottom through which the plastic pieces may contact the table. The apparatus further includes means for supporting the hopper for movement longitudinally between positions over the upper and lower segments of the table.

Preferably, the upper and lower segments of the table are parallel and vertically displaced from one another.

The hopper preferably moves longitudinally over the table and is preferably a generally rectangular box.

The cutter preferably rotates about a transverse axis and preferably has a plurality of blades mounted on a cylindrical member extending transversely between the upper and lower table segments. The blades have cutting edges extending transversely respecting the hopper and spaced from the lower table segment at a position of closest blade approach thereto for passage of reduced size plastic material therebetween.

The apparatus further preferably includes a frame supporting the table.

The apparatus preferably further includes a pair of longitudinally extending tracks connected to the frame for movement of the hopper therealong between positions above the upper and lower table segments and wheels supporting the hopper and riding in the tracks as the hopper moves between the positions above the upper and lower table segments.

Hopper longitudinal movement is preferably powered by an electric motor. The hopper moving means preferably further includes limit switches located at positions defining the limits of hopper longitudinal travel, means for powering movement of the hopper between the respective positions above the upper and lower table segments and means for reversing direction of the hopper movement powering means in response to actuation of the limit switches by the hopper at longitudinal extremities of hopper travel above the table.

Further preferably, the hopper power reversing means further includes means for delaying reversal of the hopper movement powering means for a preselected time upon the hopper contacting one of the limit switches.

The granulator further preferably includes a second granulating assembly having a transversely elongated rotor connected to the shaft of the motor for rotation therewith. A first plurality of cutting knife blades are preferably connected to the rotor at transverse extremities thereof and are preferably oriented with cutting edges of the blades parallel with the motor shaft. A base plate preferably has the motor shaft rotatably journaled therewithin.

A second plurality of cutting knife blades define a circular array connected to the base plate and upstanding therefrom with cutting edges preferably oriented in a direction parallel both with the motor shaft and with the first plurality of cutting knife blade edges. An apertured ring includes notches therein for fitting around and over the second plurality of cutting knife blades.

Annular trunco-cylindrical back plates are supported by the base plate and are positioned radially outboard of the apertured ring and axially substantially aligned with the apertured ring for deflecting granules of plastic material, resulting from cutting action of the first and second pluralities of cutting knife blades, passing through the apertured ring downwardly for collection by a storage bin.

In another of its aspects, this invention provides a method for granulating thermoplastic material for recycling through additional molding by introducing previously coarsely granulated previously molded and/or waste solid thermoplastic material into a cylindrical granulating zone via a cylinder end. The method further encompasses providing at least one stationary knife, preferably having length less than one-quarter (¼) of the diameter the cylindrical granulating zone, at a cylindrical boundary of the granulating zone. The method yet further preferably encompasses moving at least one second knife, preferably having length substantially that of the stationary knife, along the cylindrical boundary of the granulating zone to pass in proximity to the stationary knife and thereby trap portions of the thermoplastic material between the stationary moving knives and cut the portions into granules.

The method further preferably provides an apertured surface as a portion of the cylindrical boundary and further embraces sweeping portions of the material along the apertured surface with a moving cutting knife thereby causing cut portions of the thermoplastic material having granule size less than that of the apertures to pass therethrough for recycling via subsequent molding.

DETAILED DESCRIPTION OF THE PREFERRED EMBODIMENTS AND BEST MODE KNOWN FOR PRACTICING THE INVENTION

Figure 10:
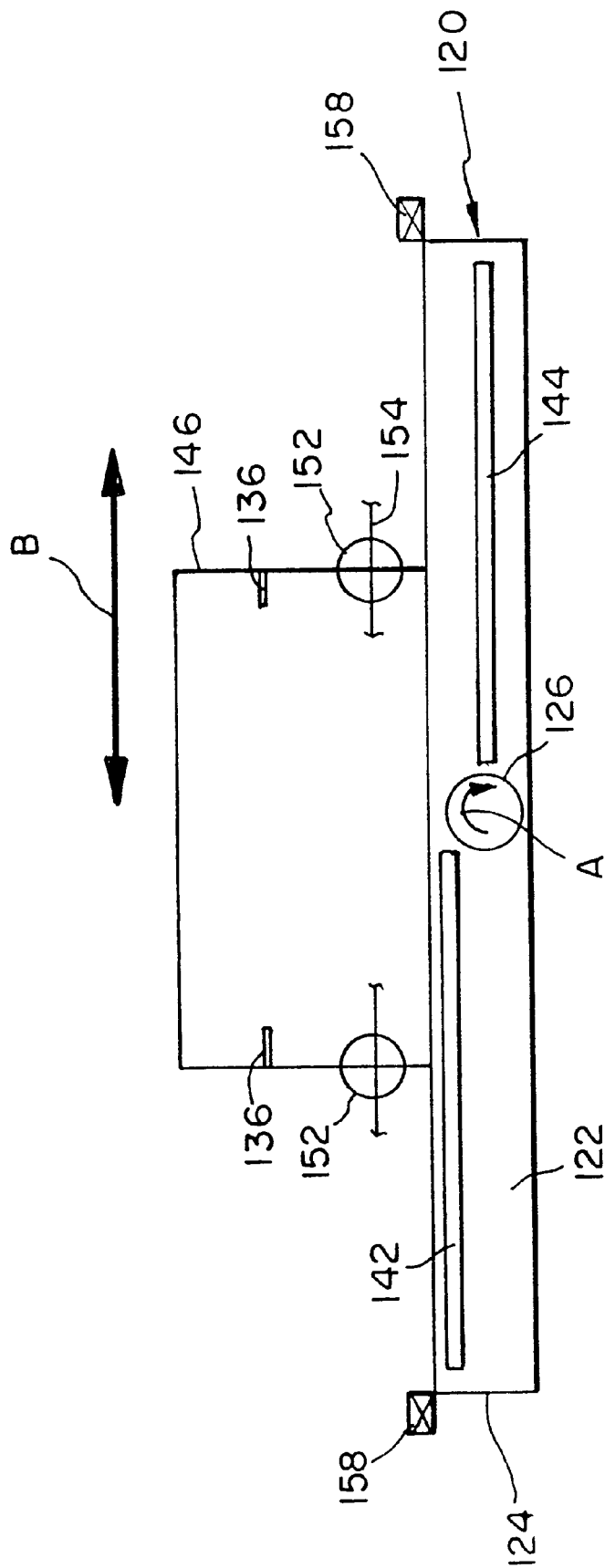
FIG. 10 is a schematic front elevation view, looking in the direction of arrow 2 in FIG. 1, of granulator apparatus manifesting aspects of the invention.

Referring to FIG. 10 which illustrates in schematic form operation of a first stage shuttle granulator section portion of granulator apparatus embodying the invention, a movable hopper box is designated generally 146 and is supported by wheels 152 which ride on a track designated 154. Movable hopper box 146 moves back and forth along track 154 in the direction indicated by doubled ended arrow B.

When movable hopper box 146 moves to the left side extremity illustrated in FIG. 10, movable hopper box 146 contacts hopper box limit switch 158 shown schematically at the left hand side of FIG. 10. When actuated, hopper box limit switch 158 signals a drive mechanism for movable hopper box 146 to reverse, thereby moving movable hopper box 146 from left to right in FIG. 10 until movable hopper box 146 contacts hopper box limit switch 158 shown schematically at the right side of FIG. 10. When this occurs, the drive means for movable hopper box 146 again reverses and moves hopper box 146 towards the left in FIG. 10; reciprocating, left-right-left-right, etc. motion of removable hopper box 146 results.

The lower portion of removable hopper box 146 moves within a rectangular box portion designated generally 120 which is a part of the frame of the granulator apparatus. Located within rectangular box portion 120 is structure referred to as a table. This table includes an upper segment 142 and a lower segment 144 which are longitudinally displaced one from another, where the longitudinal direction is the direction of reciprocation of movable hopper box 146. As schematically evidenced by FIG. 10, upper segment 142 of table 140 is also vertically displaced from lower segment 144 of table 140.

A shuttle section rotatable cutter 126 is positioned between the longitudinally and vertically displaced upper and lower table segments 142, 144 and rotates about a transverse axis as indicated generally by arrow A in FIG. 10.

Movable hopper box 146 has an open bottom.

When previously molded and/or waste solid thermoplastic material to be recycled is put into movable hopper box 146, that material comes to rest on upper table segment 142 and/or shuttle section rotatable cutter 126 and/or lower table segment 144, depending on where movable hopper box 146 is located along its path of reciprocation.

As movable hopper box 146 moves from right to left in FIG. 10, the previously molded and/or waste solid thermoplastic material within movable hopper box 146 slides along lower table segment 144, due to contact by the inside surfaces of movable hopper box 146, and contacts shuttle section rotatable cutter 126.

This results in some of the previously molded and/or waste solid thermoplastic material within movable hopper box 146 being chopped by shuttle section rotatable cutter 126 into smaller pieces of solid plastic. Those of the pieces which are small enough to fit between shuttle section rotatable cutter 126 and the proximate edge of lower table section 144 fall downwardly, passing between shuttle section rotatable cutter 126 and lower table section 144.

Figure 11:
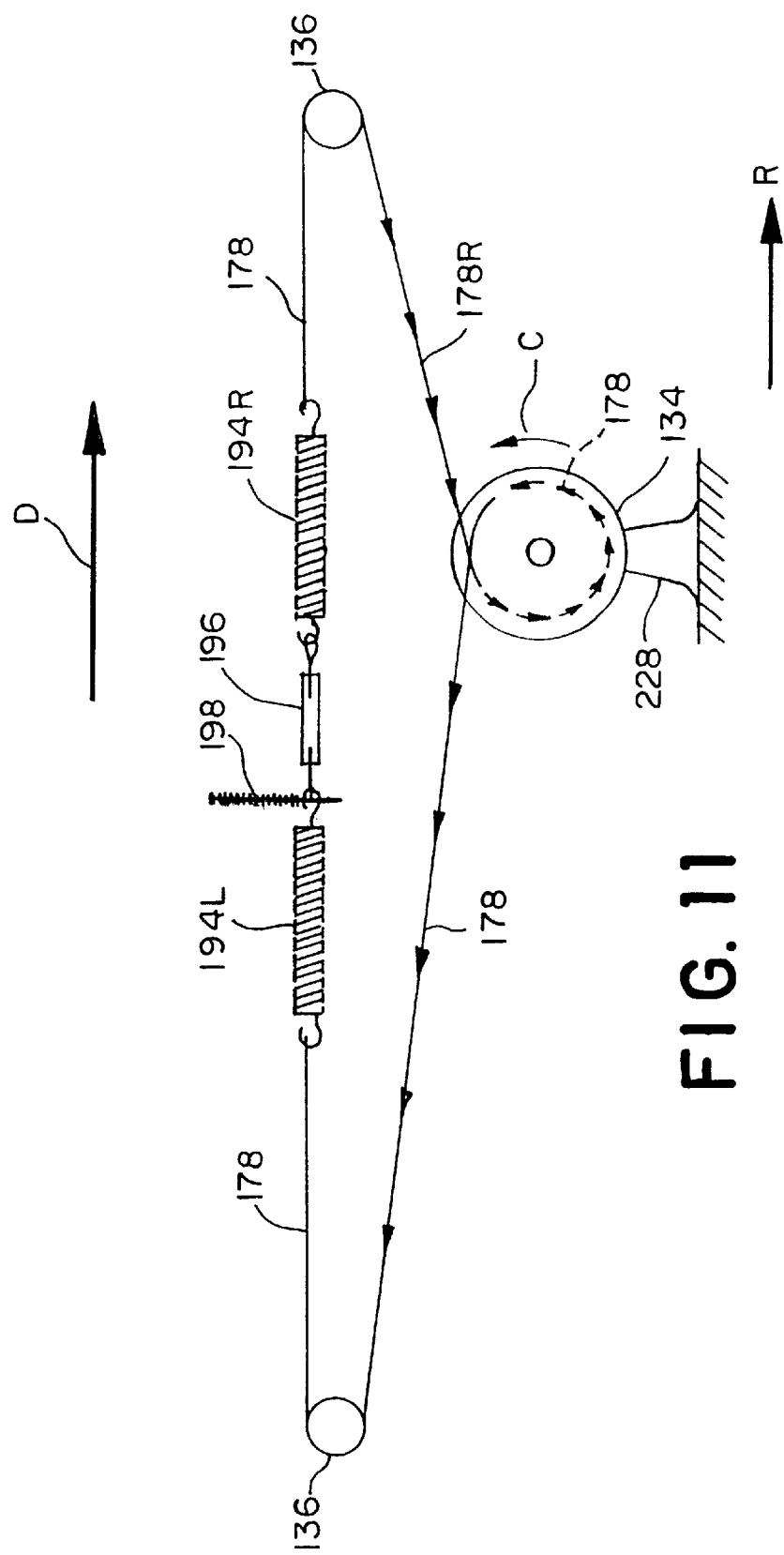
FIG. 11 is a schematic view, looking in the direction of arrow 2 in FIG. 1, of parts of the movable hopper box drive mechanism of the apparatus depicted schematically in FIG. 10.

FIG. 11 illustrates schematically the drive mechanism for movable hopper box 146. A hopper box drive pulley 134 is connected to the frame of the granulator apparatus in a fixed position relative to movable hopper box 146. This fixed connection is depicted schematically as a drive pulley support 500 in FIG. 11.

A pair of idler rollers 136, which are preferably pulleys and are rotatable about parallel transverse horizontal axes, are connected to movable hopper box 146 at respective longitudinal extremities of hopper box 146. The position of idler rollers 136 is depicted schematically in FIG. 10.

A central bolt 198 is fixed to movable hopper box 146 preferably at the longitudinal midpoint of hopper box 146 and at substantially the same height on hopper box 146 as idler rollers 136. A coil spring 194L is connected via an unnumbered spring eye to central bolt 198.

A second coil spring 194R is connected to one end of a turnbuckle 196 by an unnumbered spring eye. The remaining end of turnbuckle 196 is connected to central bolt 198.

A hopper box drive cable 178 connects to the remaining unnumbered eyes of springs 194L, 194R, loops around a portion of the peripheries of each of idler rollers 136 and wraps completely about hopper box drive pulley 134, circumscribing drive pulley 134 as illustrated in FIG. 11.

When hopper box drive pulley 134 rotates in the direction indicated by arrow C in FIG. 11, hopper box drive cable 178 moves in the direction indicated by the arrowheads which have been superimposed on the schematic depiction of hopper box drive cable 178 in FIG. 11. This movement of hopper box drive cable 178 results in longitudinal movement of movable hopper box 146 in the direction indicated by arrow D in FIG. 11.

When hopper box drive pulley 134 is rotated in the opposite direction from that indicated by arrow C, with the arrangement of hopper box drive cable 178, rollers 136 and central bolt 198 depicted in FIG. 11, movable hopper box 146 moves longitudinally to the left.

Turnbuckle 96 permits adjustment of tension in hopper box drive cable 178. Springs 194L, 194R provide a degree of shock absorption and serve to prevent breakage of cable 178 in the event of a jam of previously molded and/or waste solid thermoplastic material within movable hopper box 146 against shuttle section rotatable cutter 126, preventing moving hopper box 146 from moving longitudinally as hopper box drive pulley 134 rotates.

Figure 12:
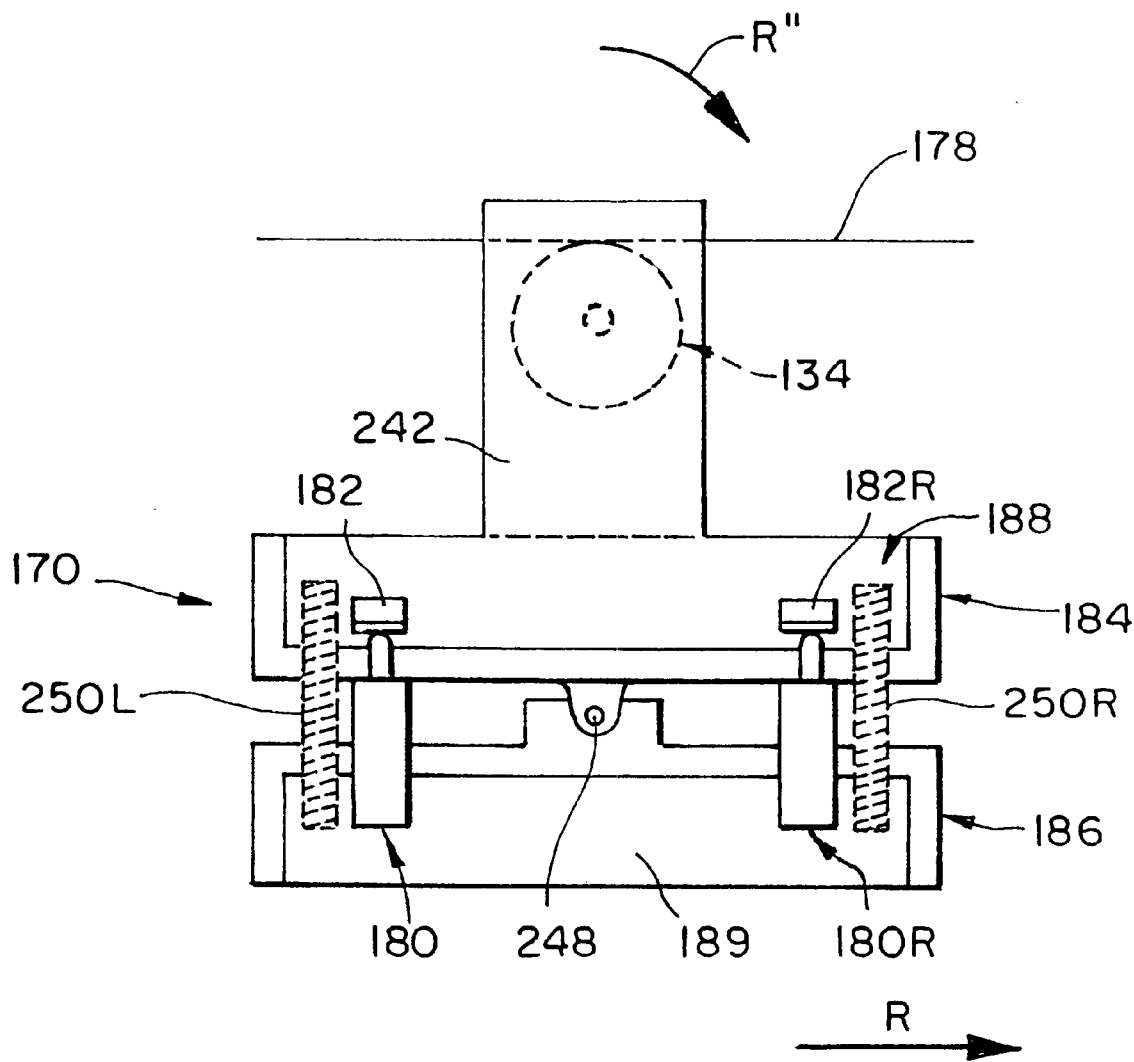
FIG. 12 is a schematic view, looking in the direction of arrow 2 in FIG. 1, of another part of the movable hopper box drive mechanism of the apparatus depicted schematically in FIGS. 10 and 11.

FIG. 12 illustrates in schematic form a rockable housing 170 to which is connected hopper box drive pulley 134 and which provides means for effectuating power shut-off for the motor driven pulley 134 in the event a jam of solid thermoplastic material within movable box 146 against rotatable cutter 126 prevents hopper box 146 from moving longitudinally as drive pulley 134 rotates.

Figure 1:
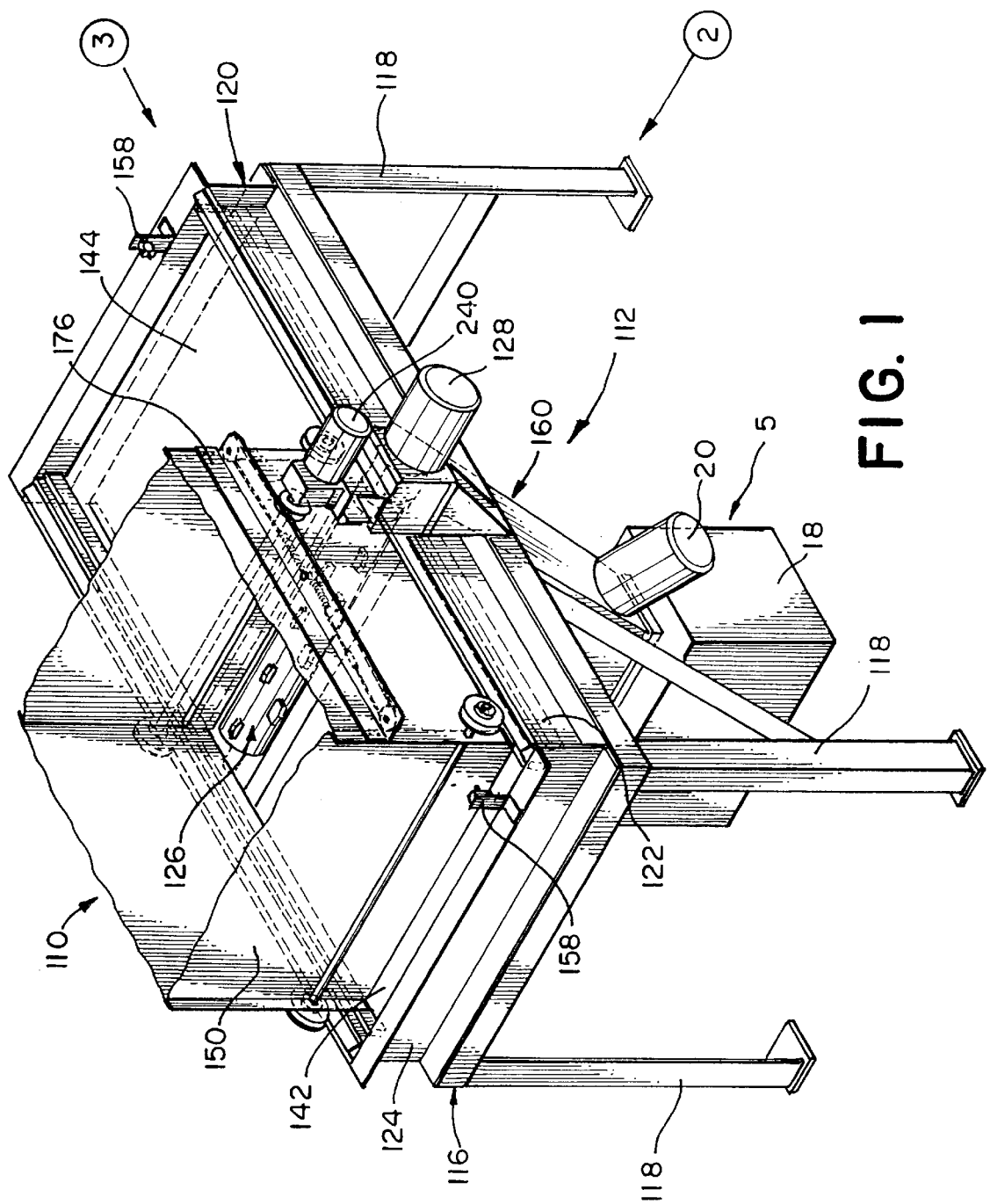
FIG. 1 is an isometric view of granulator apparatus manifesting aspects of the invention.
Figure 6:
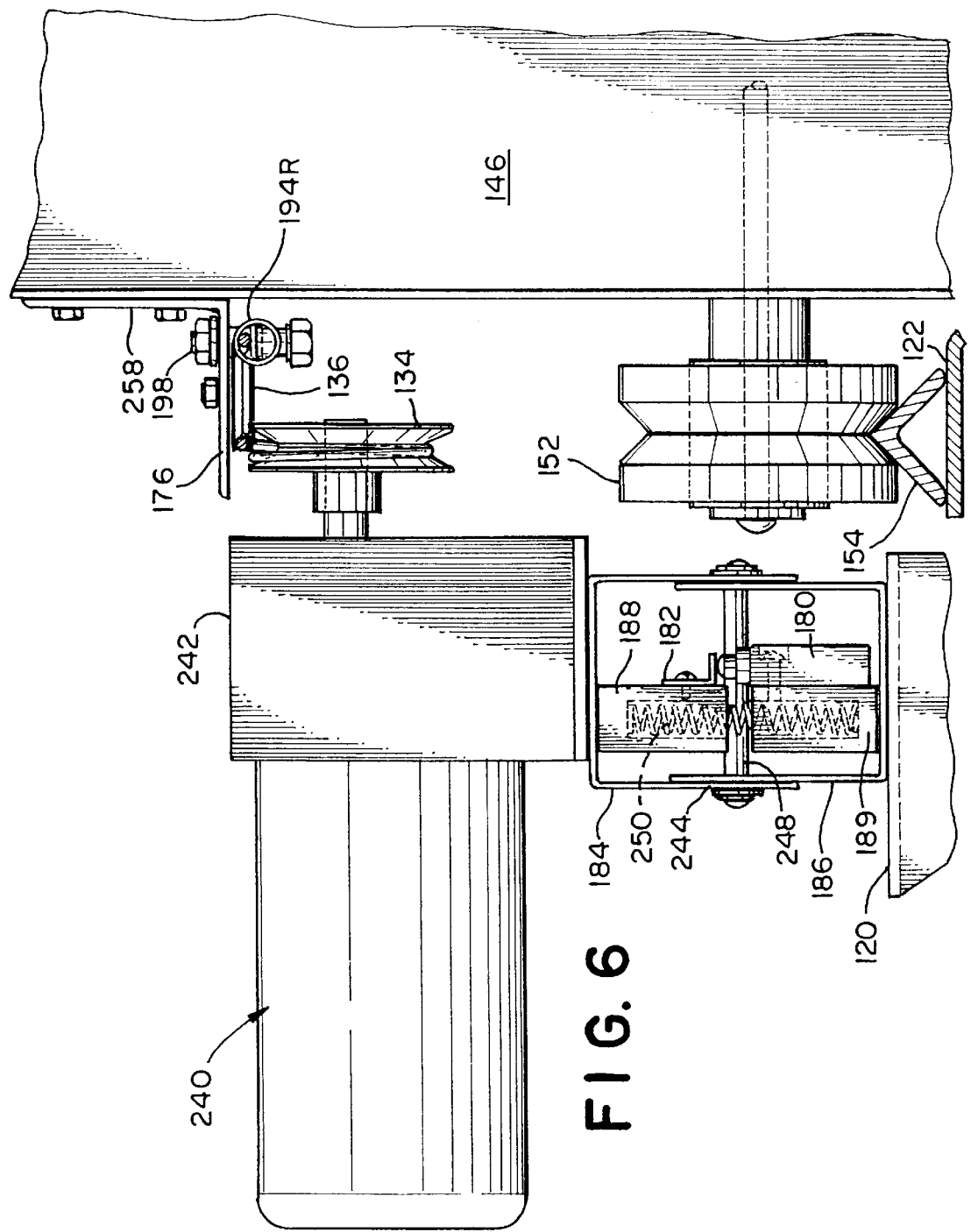
FIG. 6 is a broken side elevation view, looking in the direction of arrow 3 in FIG. 1, taken at arrows 6—6 in FIG. 5.

Hopper box drive pulley 134 is mounted on a suitable shaft for rotation by a motor 240 which is illustrated in FIGS. 1 and 6. Hopper box drive motor 240 is mounted on an upwardly extending portion 242 of an upper rockable channel portion 184 of housing 170.

Upper rockable channel portion 184 of housing 170 sits atop lower channel portion 186 of housing 170 as illustrated in FIG. 12. A lower generally planar unnumbered surface of upper rockable channel 184 has a pair of eyes, which are transversely aligned and extend downwardly from that unnumbered planar lower surface, where one of said eyes 242 is visible is FIG. 12.

An upwardly facing unnumbered planar surface of lower channel portion 186 has a vertical extension portion formed therein which is designated 246 in FIG. 12 and is bored to receive a shaft 248, also visible in FIG. 12. Shaft 248 passes through the bore in vertical extension member 246 and engages respective eyes extending downwardly from upper rockable channel portion 244 thereby providing a pivotal connection between upper rockable channel portion 184 and lower channel portion 186 of housing 170.

Within respective upper and lower channel portions 184, 186 are a pair of preferably plastic members which are illustrated schematically in FIG. 12 and define upper and lower spring blocks 188, 189 respectively. Spring blocks 188, 189 are bored or otherwise formed to receive a pair of coil springs 250 which provide resilient support for upper rockable channel portion 184 above lower channel portion 186.

Spring block 189 is further bored to receive a pair of rockable housing limit switches 180, which switches 180 of the pair are positioned on either side of the pivotal connection defined by shaft 248 and are equally removed therefrom.

Attached to upper spring block 188 and housed therewithin are a pair of members 182 for tripping respective limit switches 180 upon tilting movement of upper rockable channel portion 184, about the axis defined by shaft 248, relative to lower channel portion 186.

Limit switches 180 are electrically connected to circuitry controlling operation of hopper box drive motor 240.

Upon occurrence of a jam of solid plastic material within movable hopper box 146 against shuttle section rotatable cutter 126, preventing hopper box 146 from moving longitudinally as drive pulley 134 continues to rotate, such continued rotation of drive pulley 134 (for example, in the direction indicated by the arrows in FIG. 11), creates greater tension in the portion of hopper drive cable 178 connecting drive pulley 134 with spring 194R. This occurs as rotation of drive pulley 134 seeks to wrap more and more of hopper drive cable 178 around drive pulley 134. Since the jam of solid plastic material within movable hopper box 146 against shuttle section rotatable cutter 126 prevents movement of hopper box 146, continued rotation of drive pulley 134 and resultant wrapping of the portion of hopper drive cable 178 denoted 178R about drive pulley 134, extends coil spring 194R. As force is applied by drive cable 178 to coil spring 194R, coil spring 194R resists extension thereby causing drive cable 178 in FIG. 11 to effectively pull drive pulley 134 to the right FIG. 11, as indicated by arrow R.

Such force on drive pulley 134 in the direction of arrow R in FIG. 11 (arrow R is also illustrated in FIG. 12) causes upper rockable channel portion 184 of housing 170 to pivot about the axis defined by shaft 248, in a direction generally indicated by arrow R in FIG. 12. As upper rockable channel portion 184 pivots about the axis defined by shaft 248, right-hand limit switch trip 182R illustrated in FIG. 12 actuates associated right-hand limit switch 180R in FIG. 12.

Limit switches 180L, 180R are connected to control circuitry for hopper box drive motor 240 such that upon actuation of either limit switch 180R or 180L, power to hopper box drive motor 240 may be shut down or drive motor 240 reversed. If desired, an alarm may also be actuated to summon an operator to remove the jam of solid plastic material against shuttle section rotatable cutter 126.

Once the jam is removed and hopper drive cable 178 is reconfigured into the position illustrated in FIG. 11, spring 250R, having been compressed due to rotation of upper rockable channel portion 184 about the axis defined by shaft 248, exerts an upward force on upper rockable channel portion 284 thereby returning the upper rockable channel portion 184 to its level configuration illustrated in FIG. 12 so that granulation may resume.

FIG. 1 illustrates in isometric form granulator apparatus embodying the invention and designated generally 100. Granulator apparatus 100 includes a first stage shuttle granulator section designated generally 112 and a second stage radial granulator section designated generally 5.

Granulator apparatus 100 includes a frame designated generally 116 having four support legs, each of which is designated generally 118. Frame 116 further includes a rectangular box portion which is designated generally 120 and includes side walls 122 and end walls 124. Walls 122, 124 are preferably secured together by welding at their respective corners to define rectangular box section 120.

As illustrated in FIG. 1, rectangular box portion 120 is preferably of a configuration such that side walls 122 are generally about twice as long as end walls 124.

Positioned within rectangular box portion 120, preferably substantially at the longitudinal midpoint thereof, is a shuttle section rotatable cutter designated generally 126. A motor 128 is connected to frame 116 and rotatably drives shuttle section cutter 126.

Shuttle section rotatable cutter 126 has a plurality of blades designated generally 130 mounted thereon, where blades 130 are individually axially spaced and offset from one another and are positioned circumferentially about shuttle section rotatable cutter 126.

Blades 130 are mounted on a support cylinder portion 132 of shuttle section rotatable cutter 126. Shuttle section rotatable cutter 126 rotates in response to motor 128 and serves to cut, by chopping action, large pieces of plastic material in rectangular box portion 120 into smaller pieces; this process is referred to as "granulation".

A movable hopper box 146 has a lower portion fitting within rectangular box portion 120 as depicted in FIG. 1. Movable hopper box 146 includes a pair of side walls 148 and a pair of end walls 150 and is preferably of generally rectangular, essentially square, configuration as is apparent from FIG. 1.

Connected to respective side walls 148 of movable hopper box 146 are two pairs of wheels 152 which serve to support movable hopper box 146. Wheels 152 ride on tracks 154 which are preferably formed of angle iron and rest on upper surfaces of side walls 122 of rectangular box portion 120. Tracks 154 preferably extend substantially the full longitudinal length of side walls 122 of rectangular box portion 120, as illustrated in FIG. 1.

Connected to frame 116 and residing within rectangular box portion 120 is a table structure designated generally 140 and including an upper segment 142 and a lower segment 144. Segments 142, 144 are transversely and vertically displaced one from another as is apparent from FIGS. 2 and 4.

Still referring to FIG. 1, the upper and lower segments 142, 144 of table 140 are not entirely visible in FIG. 1. Lower table segment 144 is generally visible towards the upper right-hand portion of the granulator apparatus while upper table segment 142 is only slightly visible between end wall 150 of movable hopper box 146 and end wall 124 of box portion 20 in FIG. 1.

A pair of hopper box limit switches 158 are illustrated in FIG. 1, mounted on the upper surfaces of end walls 124 of rectangular box portion 120.

Movable hopper box 146 has an open bottom which is designated generally 156.

Located generally below shuttle section rotatable cutter 126 is a shuttle discharge chute designated generally 160 in FIG. 1 and is illustrated in FIGS. 2a, 2b and 2c.

As illustrated in FIGS. 2a, 2b and 2c, movable hopper box 146 has a top 162 which is hingedly connected to either a side wall 148 or an end wall 150 of movable hopper box 146 at a hinge pivot 166. A spring 164 is provided connected to top 162 serving to bias top 162 towards an open position, as illustrated in FIG. 2c.

FIGS. 2a, 2b and 2c further illustrate the configuration of the granulator apparatus 110 and specifically operation of the first stage shuttle granulator section 112 portion thereof.

As indicated schematically in FIG. 2a, large pieces of solid plastic material to be regranulated for recycling are loaded into movable hopper box 146, such as when movable hopper box 146 is above upper segment 142 of table 140. Once movable hopper box 146 has been loaded with plastic material, movable hopper box 146 is moved from left to right in FIG. 2a by operation of hopper box drive pulley 134 in cooperation with hopper box drive cable 178, in the manner described in greater detail with reference to FIGS. 10 and 11 herein, to the right as indicated by arrow R in FIG. 2a.

In FIG. 2a, downwardly falling large pieces of solid plastic material to be reduced to smaller size for recycling are clearly shown. Several of these large pieces are designated 252 in FIG. 2a.

FIG. 2b illustrates the movable hopper box 146 in position above lower segment 144 of table 140, ready to move to the left in FIG. 2b to effectuate contact of pieces 252 of solid plastic material to be size reduced for recycling with shuttle section rotatable cutter 126. As movable hopper box 146 moves from the position illustrated in FIG. 2b back towards the position illustrated in FIG. 2a, movable hopper box 146 with plastic pieces 252 therewithin passes over shuttle section rotatable cutter 126 as illustrated in FIG. 2c. Due to the vertical offset between lower segment 144 and upper segment 142 of table 140, this right-to-left travel of movable hopper box 146 as illustrated in FIGS. 2a through 2c results in pieces 252 of solid plastic material being forced into contact with shuttle section rotatable cutter 126 and being chopped thereby into pieces of smaller size.

Figure 13:
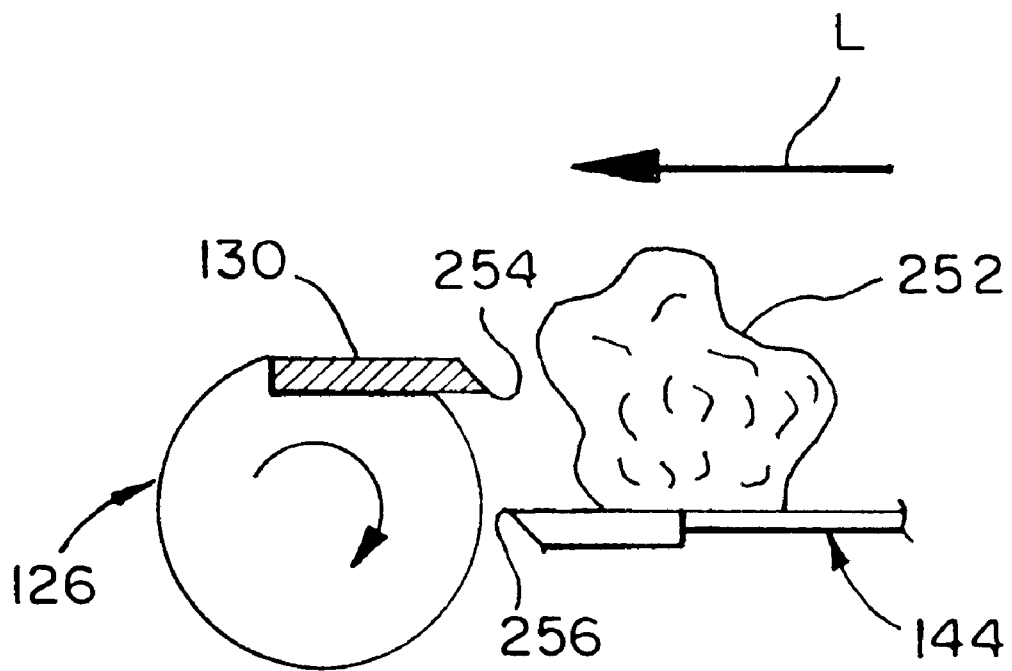
FIG. 13 is a schematic side elevation illustrating a piece of plastic to be size-reduced about to contact a cutting blade of the shuttle section cutter.

FIG. 13 illustrates in schematic form one piece 252 of solid plastic material to be size-reduced for recycling by encounter with shuttle section rotatable cutter 126. In FIG. 13 shuttle section rotatable cutter 126 is illustrated in schematic sectional form and includes a support cylinder 132 in which are mounted a plurality of blades 130 for cutting pieces of solid plastic material 252 to be size-reduced.

As illustrated in FIG. 13, pieces 252 of solid plastic material move from right to left, as indicated by arrow L in FIG. 13, due to movement of movable hopper box 146 over lower segment 144 of table 140. As the pieces of solid material 252 are moved from right-to-left relative to FIG. 13, the pieces encounter upper and lower cutting edges 220, 218 of blades 130. Cutting edges 220, 218 extend somewhat transversely, at an angle to the axis of rotation of cutter 126, respecting the direction of movement of pieces 252 as indicated by arrow L in FIG. 13. Cutting edges 220, 218 extend away from a transversely extending bow vertex of blade 130. Positioned between lower and upper cutting edges 218, 220 of blade 210 and extending away from transversely extending bow vertex are a pair of outwardly facing tapered chopping surfaces 222 of blade 210.

As plastic pieces 252 encounter cutting edges 218, 220, cutting edges 218, 220 effectively chop against solid pieces 252 thereby reducing solid pieces 252 in size. The size-reducing action of blades 130 is a chopping action applied to plastic pieces 252 as those pieces move against shuttle section rotatable cutter 126 due to the right-to-left movement of pieces 252 illustrated in FIG. 13. The size reducing action is not principally a result of blades 130 trapping plastic pieces 252 between lower cutting edge 218 and a reinforced edge 256 of lower table portion 144. Reinforced lower edge 256 does not substantially act as an anvil with respect to lower cutting edge 218; what might be characterized as a scissors-type action of lower cutting edge 218 in trapping plastic pieces 252 against reinforced table edge 256 is not the principal mode of cutting pieces 252 for size reduction thereof in the preferred practice of this invention.

In the preferred practice of the invention as the hopper box shuttles plastic material across the cutter, in the event of an overfeed or jamming of the cutter, the drive motor of the hopper box initially continues in the same direction of rotation. When this occurs, hopper box drive cable 178 tightens around hopper box drive pulley 134, causing the drive assembly defined by rockable housing 170 to seek to pivot about shaft 248. When this occurs, one of coil springs 250 is compressed.

In the preferred practice of the invention, actuation of the limit switch 180 adjacent to the compressed coil spring causes the motor circuitry to reverse direction of rotation of hopper box drive motor 240. The circuitry causes hopper box drive motor to continue to turn in such reverse direction until movable hopper box 146 contacts one of hopper box limit switches located at an end wall 124 of box portion 120. Actuation of such hopper box limit switch 158 causes the circuitry to again reverse the direction of rotation of hopper box drive motor 240, causing the movable hopper box 146 to again approach shuttle section rotatable cutter 126. With this approach many times the jam of plastic material will self-release or release in reaction to a repeated, second contact with shuttle section rotatable cutter 126.

Most desirably, movable hopper box 146 is filled with solid plastic material to be size-reduced when movable hopper box 146 is above upper segment 142 of table 140.

A pair of nylon or plastic guides are preferably provided mounted on the inside lower surfaces of side walls 122 of rectangular box portion 120 for contact with the lower portion of movable hopper box 146 as it reciprocates back and forth over the table. These nylon or plastic guides provide low friction contact in the event movable hopper box cants slightly sideways on wheels 152 riding on tracks 154.

Figure 3:
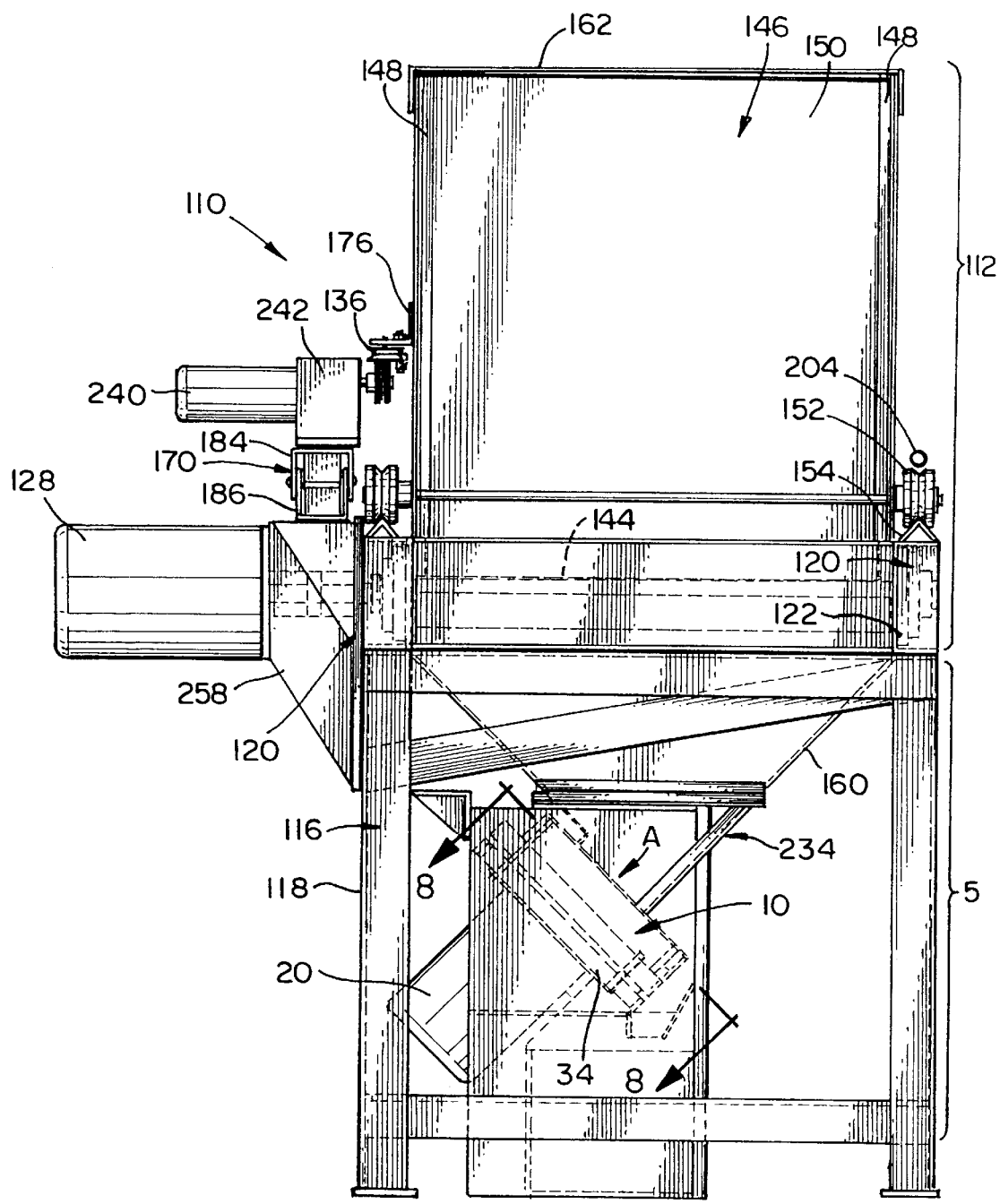
FIG. 3 is an end view of the apparatus of FIG. 1 taken looking in the direction of arrow 3 in FIG. 1.

A holddown rod is preferably provided riding on top of wheels 152 on the side of movable hopper box remote from the hopper box drive pulley 134, hopper box drive cable 178 and the associated mechanism for moving hopper box 146 reciprocally back and forth over rectangular box portion 120. Holddown rod 204 is illustrated in FIG. 3 and is preferably affixed to rectangular box portion 120 at respective ends of side walls 122 by suitable elevating structure, not shown in the drawings. Holddown rod 204 preferably rides in the V-shaped groove of wheels 152 which contact the vertex of tracks. 154 as also generally illustrated in FIG. 3.

Hopper box drive cable 178 is preferably plastic coated wire, preferably multi-strand wire.

Figure 7:
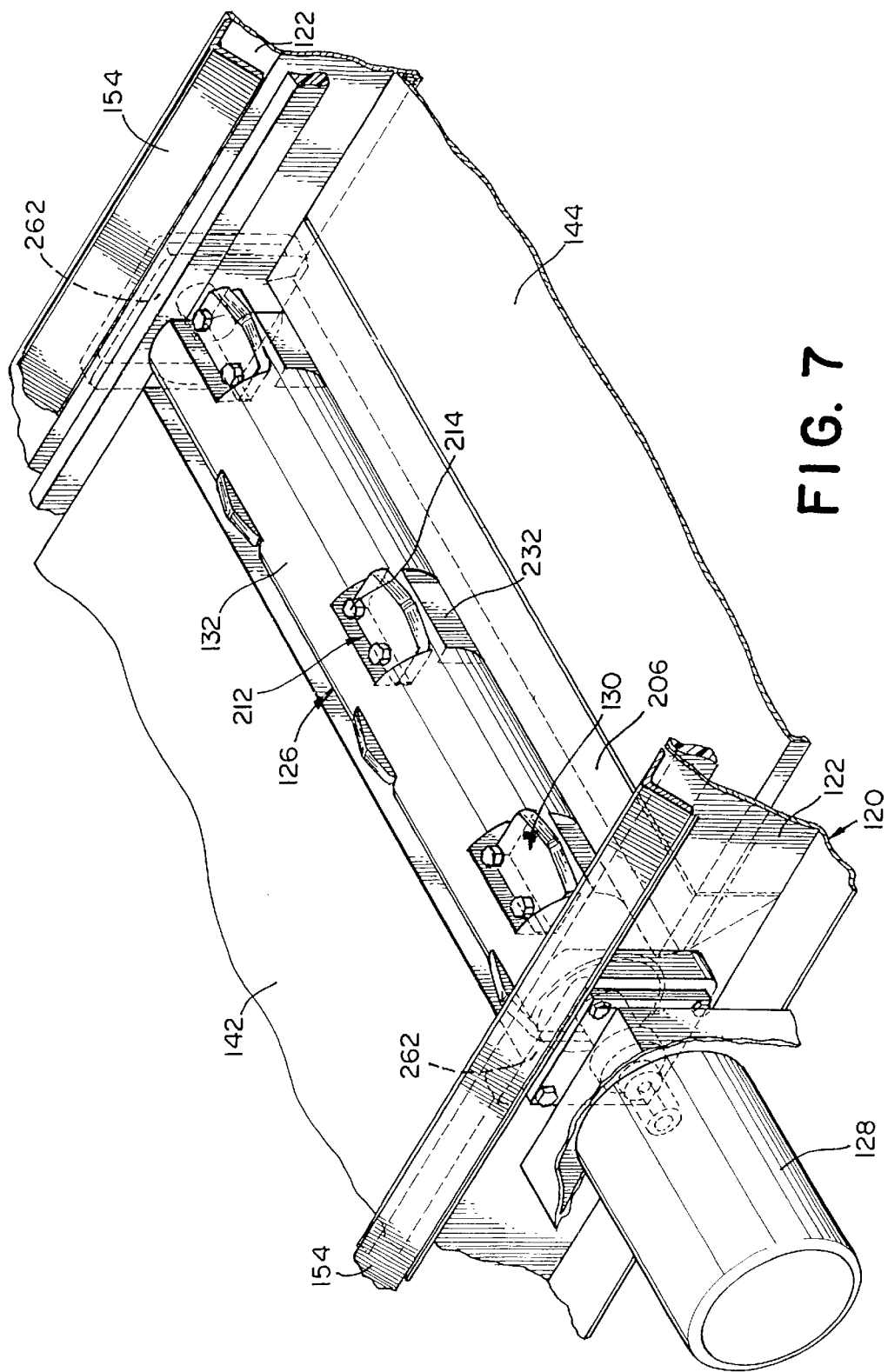
FIG. 7 is a broken isometric detail view of a rotatable shuttle section cutter and table structure forming a part of the granulator apparatus illustrated in FIG. 1.

Axial staggering of cutter blades 130 illustrated in FIG. 7 helps to prevent jamming by continually varying the position at which a piece of plastic is being cut or chopped during encounter with shuttle section rotatable cutter 126.

Rectangular box portion 120 is preferably formed from a series of longitudinally elongated beam members having flat, transversely elongated upper and lower flanges which provide convenient surfaces for mounting of tracks 154 thereon.

Preferably, movable hopper box 146 is filled with plastic material to be size-reduced when movable hopper box 146 is above upper segment 142 of table 140, in the position illustrated in FIG. 2a. Additionally, the top 162 of movable hopper box 146 preferably is pivotally mounted to movable hopper box 146 in the position and configuration illustrated in FIG. 2a. This mounting minimizing risk of injury to any operator filling movable hopper box 146 with plastic material to be size-reduced since the position of the lid forces the operator to stand away from the portion of the apparatus where shuttle section rotatable cutter 126 is located. Additionally, with the movable hopper box in position above upper table segment 142, rotation of shuttle section rotatable cutter 126 does not result in any significant cutting or chopping of plastic material within movable hopper box 146.

A second stage radial granulator section of granulating apparatus 110 is designated generally 5 and has a cutting chamber oriented such that material enters from first stage shuttle granulator section 112 in a direction generally parallel to the axis of rotation of radial granulating blades. Second stage radial granulator section 5 includes a motor, a rotor mounted on the motor shaft for rotation about a circular cutting path, knives attached to the rotor, a filter ring circumscribing the rotor cutting path with a plurality of stationary knives positioned therearound and an exit ring assembly positioned behind the filter ring for channeling resulting granular plastic material away from the cutting path, all as described in more detail below.

Figure 8:
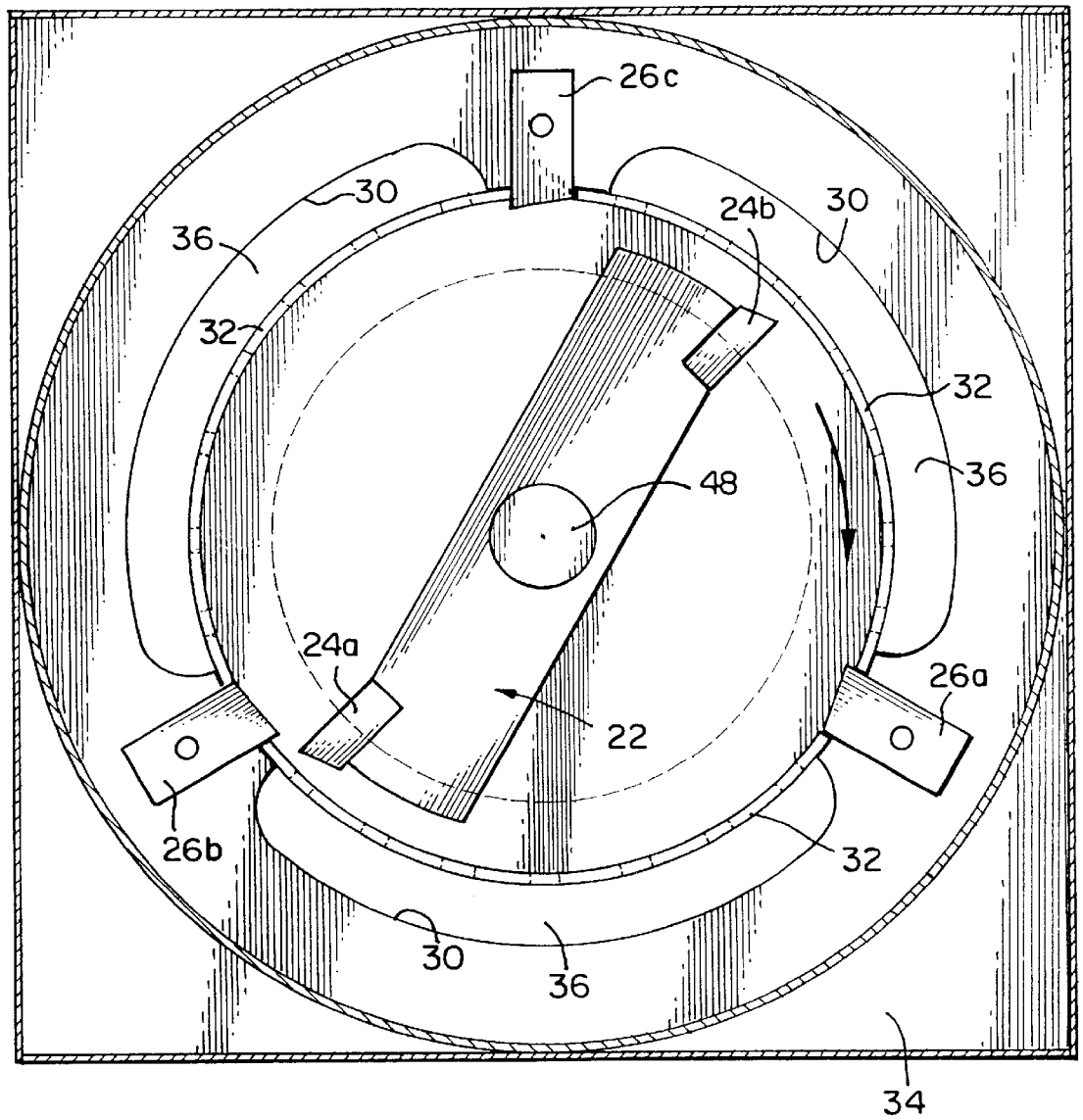
FIG. 8 is a schematic sectional view of granulator apparatus manifesting aspects of the invention taken at arrows 8—8 in FIG. 3.
Figure 9:
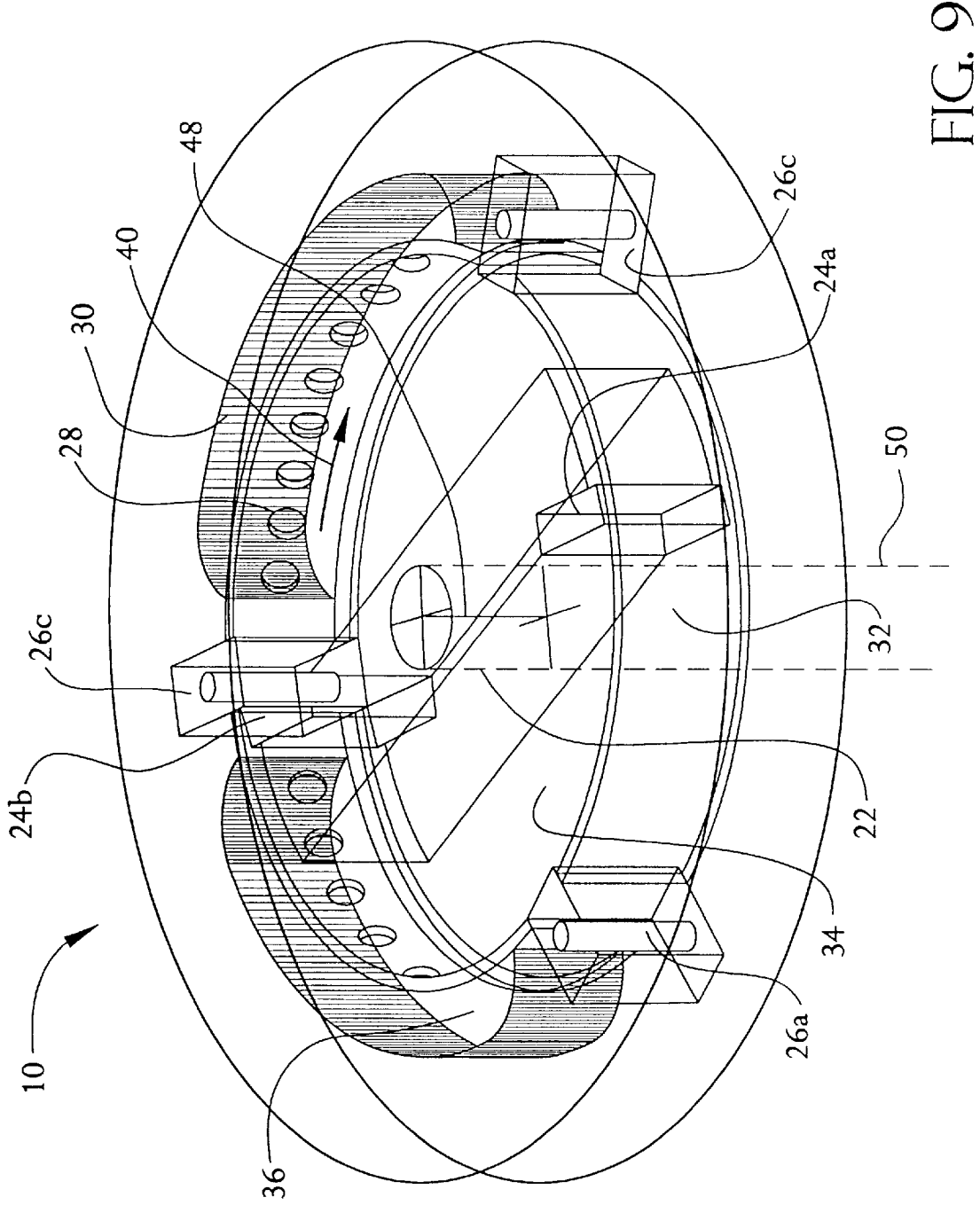
FIG. 9 is a diagrammatic perspective view of a second stage radial granulator portion of the apparatus illustrated in FIG. 1, illustrating some of the same structure shown in FIG. 8.

Referring now to FIGS. 3, 8 and 9, second stage radial granulator section 5 includes a radial granulating assembly which is designated generally 10. A duct designated 234 guides coarsely granulated material along a downward path 12 leading from first stage shuttle granulator section 112 to radial granulating assembly 10 which is driven by a motor 20.

Duct 234 guides downwardly falling coarsely granulated plastic material, to be further and more finely granulated for recycling, into a cutting chamber. The walls of duct 234 channel and arrange the downwardly flowing coarsely granulated material such that it enters the cutting chamber of radial granulating assembly 10 in a direction generally parallel to the axis of the rotor carrying the moving radial granulating blades, as indicated by directional arrow A in FIG. 3. The axis of rotation of the output shaft of motor 20 is designated 48 in FIGS. 8 and 9. The apparatus preferably includes a removable storage bin 18, illustrated in FIGS. 1, 2 and 3, for collecting finely granulated plastic material after processing by radial granulating assembly 10.

Radial granulating assembly 10 may be powered by alternating current of 120 or 240 volts, depending on the requirements of motor 20 driving radial granulating assembly 10.

Figure 2:
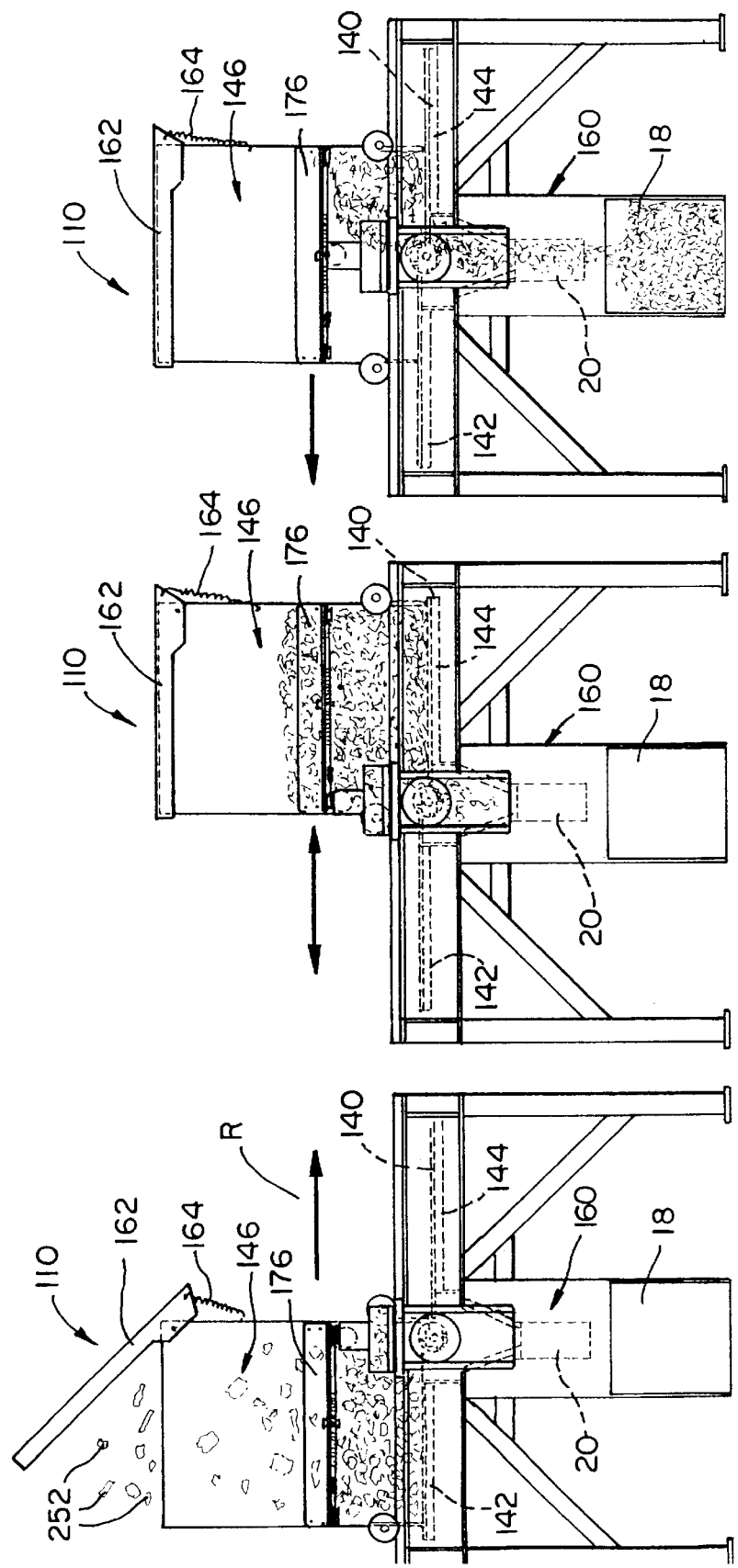
FIG. 2, which has three parts, denominated 2a, 2b and 2c, is a front view of the granulator apparatus illustrated in FIG. 1 taken looking in the direction of arrow 2 in FIG. 1, partially in schematic form with a movable hopper box portion of the apparatus illustrated in different positions in FIGS. 2a, 2b and 2c.

Referring now to FIGS. 8 and 9, radial granulating assembly 10 includes rotor 22 mounted on an output shaft 50 of motor 20. Radial granulating assembly 10 further includes a filter ring 32 which is of annular configuration and is preferably notched to fit over stationary radial granulating knives 26a, 26b and 26c, which are preferably fixedly connected to base plate 34. In one preferred practice of the invention, knives 24, 26 are about one and three-quarters (1 ¾) inches in length where this dimension is measured in the axial direction, parallel with the axis of rotation 50 of motor 20. Motor 20 is illustrated in FIGS. 1, 2 and 3 but not in FIG. 8 or 9.

A radial cutting chamber 62 is of cylindrical configuration and is defined by the annular inwardly facing surface of filter ring 32 which fits about stationary knives 26a, 26b and 26c. Cutting chamber may 52 have a diameter of about ten (10) inches and may be as high as fifteen (15) inches.

Rotor 22 is preferably a two (2) inch square steel bar and is preferably about nine (9) inches long, with moving radial granulating knives 24a, 24b at either end provided to essentially nearly tangentially contact the annular inwardly facing surface of filter ring 32. Stationary knives 26a, 26b and 26c are disposed essentially radially with respect to the axis of rotation of motor output shaft 50, as illustrated in FIG. 9, whereas knives 24a, 24b mounted at the transverse extremities of rotor 22 are canted with respect to rotor 22. This canted position effectively serves to trap coarsely granulated plastic material, received from first stage shuttle granulator section 112, between cutting edges of moving knives 24a, 24b and stationary knives 26a, 26b and 26c as rotor 22 rotates. This trapping causes the coarsely granulated material to be additionally and further cut between the very closely spaced edges of knives 24a, 24b, 26a, 26b and 26c into even smaller granules. The resulting very small granules then pass through apertures 28 in filter ring 32 and fall downwardly between filter ring 32 and exit ring 30, into storage bin 18 positioned below second stage radial granulator assembly 10.

A bearing locates and connects rotor 22 to ring 32 through a base plate 34.

Motor 20 has a shaft 50 operably connected to rotor 22. The ends of rotor 22 move along and define a circular cutting path 40; ends of rotor 22 have knives 24a and 24b secured thereto for sweeping rotary movement along cutting path 40.

The cutting path 40 of knives 24a and 24b is circular, bounded by filter ring 32. Filter ring 32 is preferably a single steel band, preferably notched to fit over stationary knives 26a, 26b, 26c.

The portions of filter ring 32 between the notches fitting over stationary knives 26a, 26b, 26c preferably have a plurality of apertures of diameter consistent with the largest of the very small granules desired to be produced by granulating assembly 10. The aperture portion of filter ring 32 preferably extends over about two-thirds (⅔) of the rotor cutting path. In an alternate embodiment, apertures may extend over the full 360° of cutting path 40; however the orientation of the granulating assembly 10 in the preferred embodiment has motor shaft 50 sloped as illustrated in FIGS. 1 and 3 so that the top one-third (⅓) of the cutting path contributes little to throughput.

Stationary knives 26a, 26b, 26c are secured to base plate 34 and spaced symmetrically therearound for granulating cooperation with knives 24a, 24b carried by rotor 22.

Exit ring 30 is positioned behind filter ring 32 to define channels 36 between the apertured portions of the filter ring 32 and exit ring 30. Channels 36 provide a path, which preferably passes through base plate 34, to storage bin 18 positioned underneath, for downward passage of very small granules having a maximum dimension corresponding to that of apertures of filter ring 32.

Plastic material which has already been coarsely granulated in first stage shuttle granulator section 112 flows downwardly along path 12 and is directed towards granulating assembly 10, in a direction parallel to the axis of rotation of rotor 22, which is defined by motor shaft 50, for further granulation into even smaller granules having maximum dimension corresponding to that of the apertures of filter ring 32. The granules pass through the apertured portion of filter ring 32 down through exit channel 36 to storage bin 18.

In one preferred practice, moving and stationary knives 24, 26 are one and three-quarters (1+¾) inches long with length being measured in a direction parallel to the axis of rotation of rotor 22 on which movable knives 24 are mounted. In this preferred practice, motor 20 is a three (3) horsepower and the cutting chamber, defined by filter ring 32, exit ring 30 and base plate 34, has a ten (10) inch inner diameter measured at the annular inwardly facing surface of filter ring 32 and a height of one and threequarters (1+¾) inches measured parallel to the axis of rotation of motor 20.

In this preferred practice, knives 24 are preferably canted with respect to rotor 22 so as to form an angle of about eighty degrees (80°) at the point of apparent tangency and closest approach to filter ring 32. This is to be contrasted to stationary knives 26 which preferably form an angle of ninety degrees (90°) with the inner surface of filter ring 32.

The geometry of cutting chamber 62 defined by filter ring 32, base plate 34, rotor 22 and knives 24, 26 permits downward flow of coarsely granulated plastic material to be further granulated for recycling in a direction essentially parallel to the axis of rotation of rotor 22. This geometry and the resultant mechanical advantage inherent in the geometric design and sizing facilitates use of a low horsepower motor in the radial granulating section of the apparatus thereby providing for lower cost apparatus.

Stationary knives 26 are preferably bolted to base plate 34. Filter ring 32, having pockets formed therein for fitting over stationary knives 36, fits over top of stationary knives 36 and flushly abuts base plate 34. Filter ring 32 may be retained in place by suitable bolts, not shown in the drawings.

Respecting the geometry of the cutting chamber, the ratio of knife edge length to cutting circle diameter is considerably less than one to one; this ratio affects power required of motor 20 and thereby facilitates mechanical advantage and resultant efficiency provided by second stage radial granulator section 14.

In FIG. 3, the granulator apparatus 110 is illustrated generally with first stage shuttle granulating section 112 being indicated by a so-numbered bracket and second stage radial granulating section 5 also being indicated by a so-numbered bracket.

As illustrated in FIG. 3, frame 116 includes a support housing 258 mounted on the side of frame 116 and providing support for the rockable housing designated generally 170. Housing 170 in turn supports hopper box drive motor 240 as well as upper extension portion 242 of upper rockable channel portion 184. Suitable gear speed reduction means for hopper box drive motor 240 may be located in upper extension portion 242; control circuitry for hopper box drive motor 240, which control circuitry is preferably connected to rockable housing limit switches 180L, 180R as well as hopper box limit switches 158, is also preferably housed in upper extension portion 242.

Idler pulleys 136 are illustrated in FIG. 3 where these idler pulleys 136 are rotatable about vertical axes. Idler pulleys 136 are preferably connected to an angle iron member 262 extending longitudinally along the length of a side wall 148 of movable hopper box 146.

As is further visible in FIG. 3, hopper box drive pulley 134 is connected to a shaft rotated by hopper box drive motor 240, which shaft emerges transversely from upper extension portion 242 of upper rockable channel portion 184 of rockable housing 170.

Tracks 154, on which wheels 152 supporting movable hopper box 146 ride, are fixedly connected to horizontally extending upper portions of side walls 122 of box portion 120 of frame 116.

Motor 128, which drives shuttle section rotatable cutter 126, is connected thereto via a coupling shown in dotted lines in the drawings. Shuttle section rotatable cutter 126 is preferably journaled in a pair of pillow-type bearings 262 mounted on respective outwardly facing surfaces of side walls 122 forming a portion of rectangular box portion 120.

In FIG. 3, the geometry of movable hopper box 146 is shown with lower portions of side walls 148 extending below the vertical upper extremities of side walls 122 and slidably contacting inner surfaces thereof so as to maintain movable hopper box 146 in position as it moves reciprocally along tracks 154 between positions above upper and lower table segments 142, 144.

Figure 14:
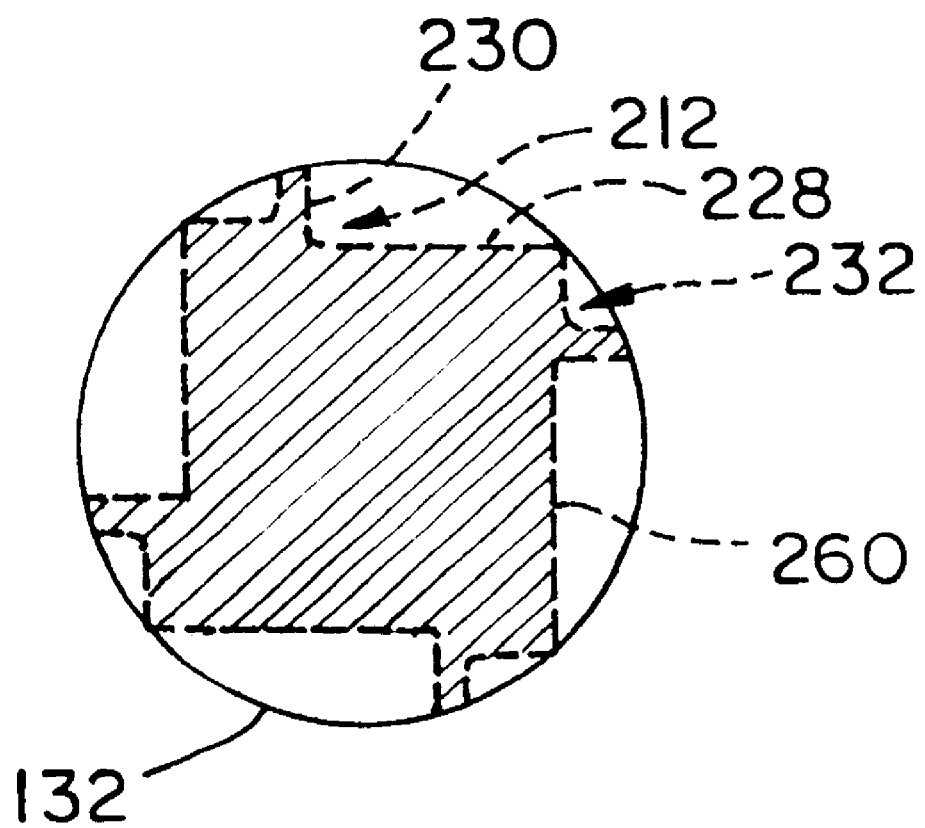
FIG. 14 is a sectional view of the cutter cylinder forming a part of the shuttle section cutter.

FIG. 14 illustrates a section in schematic form of the support cylinder 132 portion of shuttle section rotatable cutter 126. As illustrated in FIG. 14, a series of pockets designated generally 212 are provided for receiving blades 130 of cutter 126. Pockets 212 as illustrated in FIG. 14 have a pair of surfaces which are substantially perpendicular one to another; the longer of the two surfaces supports the bottom surface of a blade 130. The shorter of the two surfaces provides abutting support for a rear surface of a blade 130.

Circumferentially adjacent to each blade pocket 212 there is preferably provided an undercut pocket 232 in the form generally illustrated in FIG. 14. Undercut pocket 232, similarly to blade pocket 212, has two surfaces which are generally transverse one to another. The longer of the two transverse surfaces of undercut pocket 232 is preferably essentially transverse to and effectively nearly intersects with the longer of the two transverse surfaces of blade pocket 212.

The shorter of the two transverse surfaces of undercut pocket 232 is preferably essentially parallel to the longer of the two transverse surfaces of blade pocket 212. Undercut pockets 232 facilitate downward passage of cut pieces of plastic which fall between shuttle section rotatable cutter 126 and lower table edge reinforcer 206.

Figure 15:
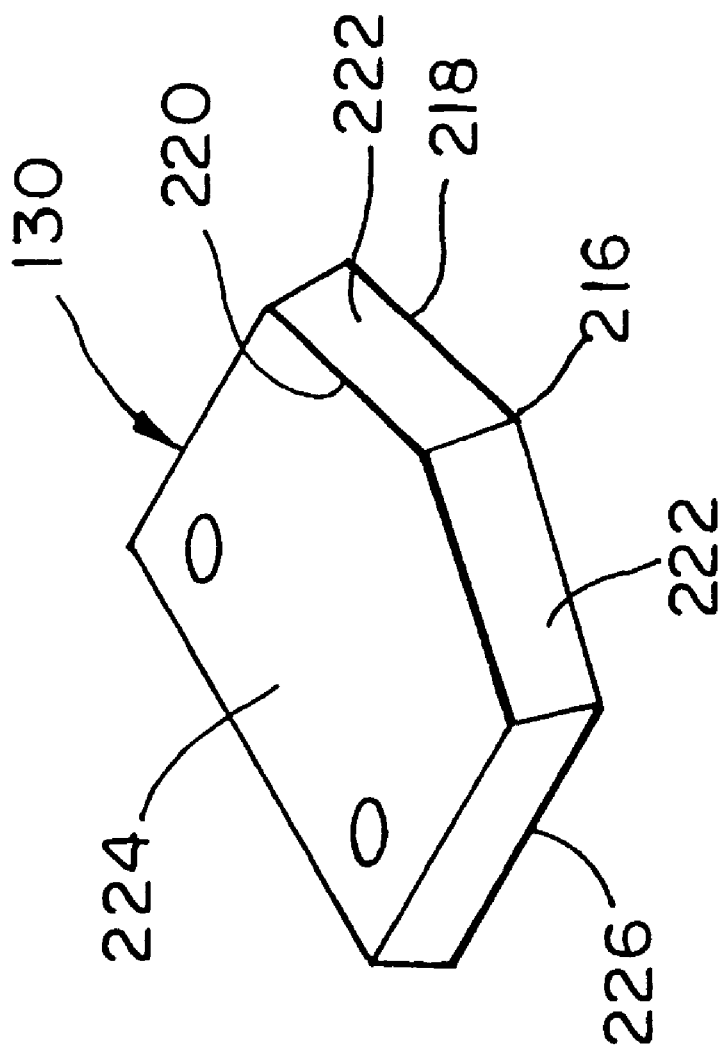
FIG. 15 is an isometric view of a blade portion of the shuttle section rotatable cutter.

FIG. 15 illustrates a blade 130 of shuttle section rotatable cutter 126 in greater detail. Blade 130 has a top surface 224 and a bottom surface 226 which are preferably parallel one to another and flat. It is particularly important that bottom surface 226 be planar in order to fit in snug facing contact with the longer of the two transverse surfaces of blade pocket 212 illustrated in FIG. 14, where the longer of these two transverse surfaces has been designated 260 in FIG. 14.

Blade 130 further includes apertures, unnumbered in FIG. 15, for receiving blade holddown bolts 214 which secure blades 130 into blade pockets 212 as illustrated in FIG. 7.

Blade 130 further includes a transversely extending bow vertex which is between two tapered bow surfaces 222. Intersection of tapered bow surfaces with blade top surface 224 defines an upper cutting edge 220. Similarly, intersection of tapered bow surfaces 222 with blade bottom surface 226 defines a lower cutting edge 218. Upper and lower cutting edges 220, 218 have two segments and meet at transversely extending bow vertex 216, all as illustrated in FIG. 15.

As illustrated in FIG. 13, blades 130 and particularly upper and lower cutting edges 220, 218 extend outwardly beyond the circular periphery of support cylinder portion 132 of shuttle section rotatable cutter 126. Accordingly, as shuttle section rotatable cutter 126 rotates, blades 130 with upper and lower cutting surfaces 220, 218 move through a circle having a relatively large component of motion in a horizontal direction from left to right in FIG. 13, thereby effectively driving into pieces of plastic material such as depicted schematically by 252 in FIG. 13 where the blade drives into that material from left to right in FIG. 13 as the material is urged to the left by action of movable hopper box 146. The configuration of shuttle section rotatable cutter 126, with bottom surfaces 226 of blades 130 extending outwardly beyond the circular periphery of support cylinder 132, facilitates this chopping action providing highly efficient granulation of plastic pieces 252 as movable hopper box 146 carries the plastic pieces from left to right in FIG. 2 and urges those plastic pieces against rotating shuttle section cutter 126.

The circuitry controlling operation of movable hopper box and particularly hopper box drive motor 240 may either reverse the direction of rotation of hopper box drive motor 240 or change gearing connecting hopper box drive motor 240 to hopper box drive pulley 134, to reverse the direction thereof, in response to actuation of limit switches by movable hopper box 146. The control circuitry further operates to delay the reversal of movement of movable hopper box 146 for a preselected time, typically one second, upon movable hopper box 146 contacting one of limit switches 158. This delay in the reversal of movement of movable hopper box 146, by delaying reversal of the direction of rotation of hopper box drive motor 240, protects against inadvertent burn out of motor 240 upon reversal.

Figure 5:
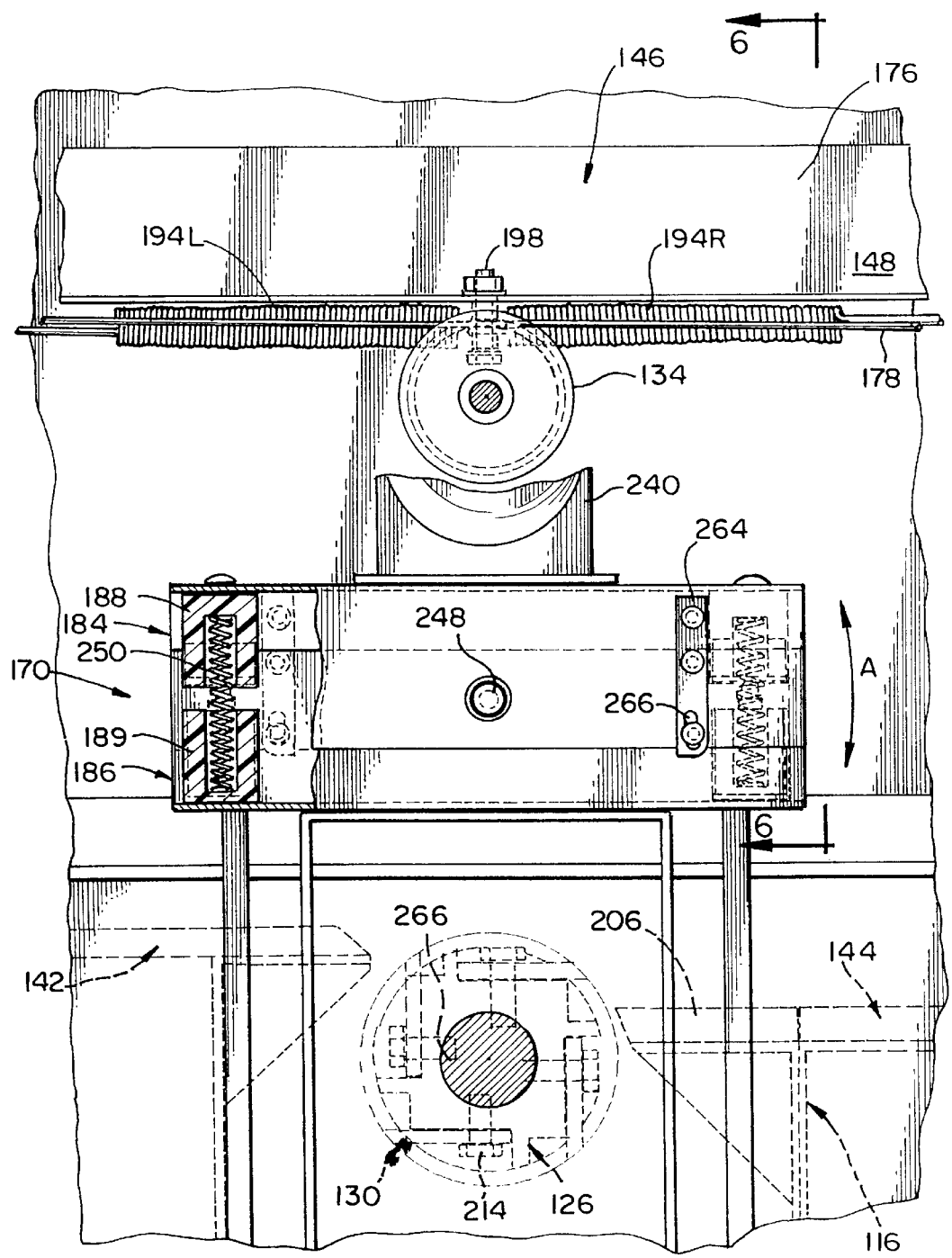
FIG. 5 is an enlarged, broken schematic view of a central portion of structure illustrated in FIG. 4.

FIG. 5 provides an elevation detail of the rockable housing which signals occurrence of a jam of plastic material within movable hopper box 146 and cuts power to hopper box drive motor 240. In FIG. 5, upper rockable channel portion 184 is illustrated pivotally mounted on lower channel portion 186 via shaft 248 and being supported by respective springs 250 residing within upper and lower spring blocks 188, 189. Upper and lower rockable channel portions 184, 186 are further connected together via a pair of straps 264 which are preferably disposed on either side of shaft 248 defining the pivotal connection. Straps 264 are preferably metal and connected to respective upper and lower rockable channel portions 184, 186 via suitable bolts or other fasting means. The bolts are not numbered in FIG.

5. Strap 264 includes a vertical slot 266, partially visible in FIG. 5 within which one of the bolts or other fasting members resides. The presence of the bolt or other fasting member within slot 266 in a sliding, as opposed to tight, fit facilitates rocking motion of upper rockable channel 184 relative to lower rockable channel 186 about shaft 248 in the direction generally indicated by curved arrow A in FIG. 5.

FIG. 5 also illustrates in dotted lines upper and lower table segments 142, 144 and shuttle section rotatable cutter 126 with blades 130 being held in position in blade pockets 212 by blade holddown bolts 214. A shaft and coupling connection via which motor 128 drives shuttle section rotatable cutter 126 are illustrated in section and indicated generally as 268 in FIG. 5.

Referring to FIG. 7, shuttle section rotatable cutter 126 is journaled in a pair of pillow bearings designated generally 262.

Blade pockets 212 are illustrated in FIG. 7. Blade pockets 212 are arranged generally in rows, with three such blade pockets being illustrated in a single row in FIG. 7, oriented in a given angular position on support cylinder 132 of shuttle section rotatable cutter 126. Blade pockets 212 of a given row located at a given angular position on support cylinder 132 are preferably axially offset from blade pockets 212 of an angularly adjacent row. As illustrated in FIG. 7, the blade pockets 212 facing towards the lower right-hand corner of the drawing are in a row which is in position so that they are longitudinally or axially offset respecting the blade pockets of the blades which point towards the upper portion of the drawing and appear at the upper edge portion of support cylinder 132 in the configuration illustrated in FIG. 7. Additional blade pockets, which are not visible in FIG. 7 as a result of being located at different angular orientations on support cylinder 132, are similarly axially or longitudinally offset from remaining blade pockets and blades. This orientation and arrangement of the blade pockets and blades provides highly effective chopping of solid plastic material to be granulated.

As further illustrated in FIG. 7, the undercut pockets 232 are open and provide greater space for passage of chopped plastic material to fall downwardly between shuttle section rotatable cutter 126 and a reinforced strengthened edge portion 206 of lower table segment 144. Lower table segment edge reinforcer 206 is also illustrated in FIG. 5 in dotted lines and is preferably made of extremely strong steel, ceramic or other material which is highly resistant to chipping or breaking on impact loading.

The longitudinally or axially offset positioning of blades 130 and blade pockets 212 in support cylinder 132 is also illustrated in FIG. 1.

Configuration of blade pockets 212 having a bottom surface 228 and a rear surface 230 as illustrated in FIG. 7 and in FIG. 14 works together with the configuration of blades 130 to provide high strength support for blades 130. Specifically, bottom surface 226 of blade 130 fits flushly against pocket bottom surface 228 and the rear, upstanding, unnumbered surface of blade 130 fits flushly against pocket rear surface 230. Blades 130 are secured in position by blade holddown bolts 214 illustrated in FIG. 7.

Figure 4:
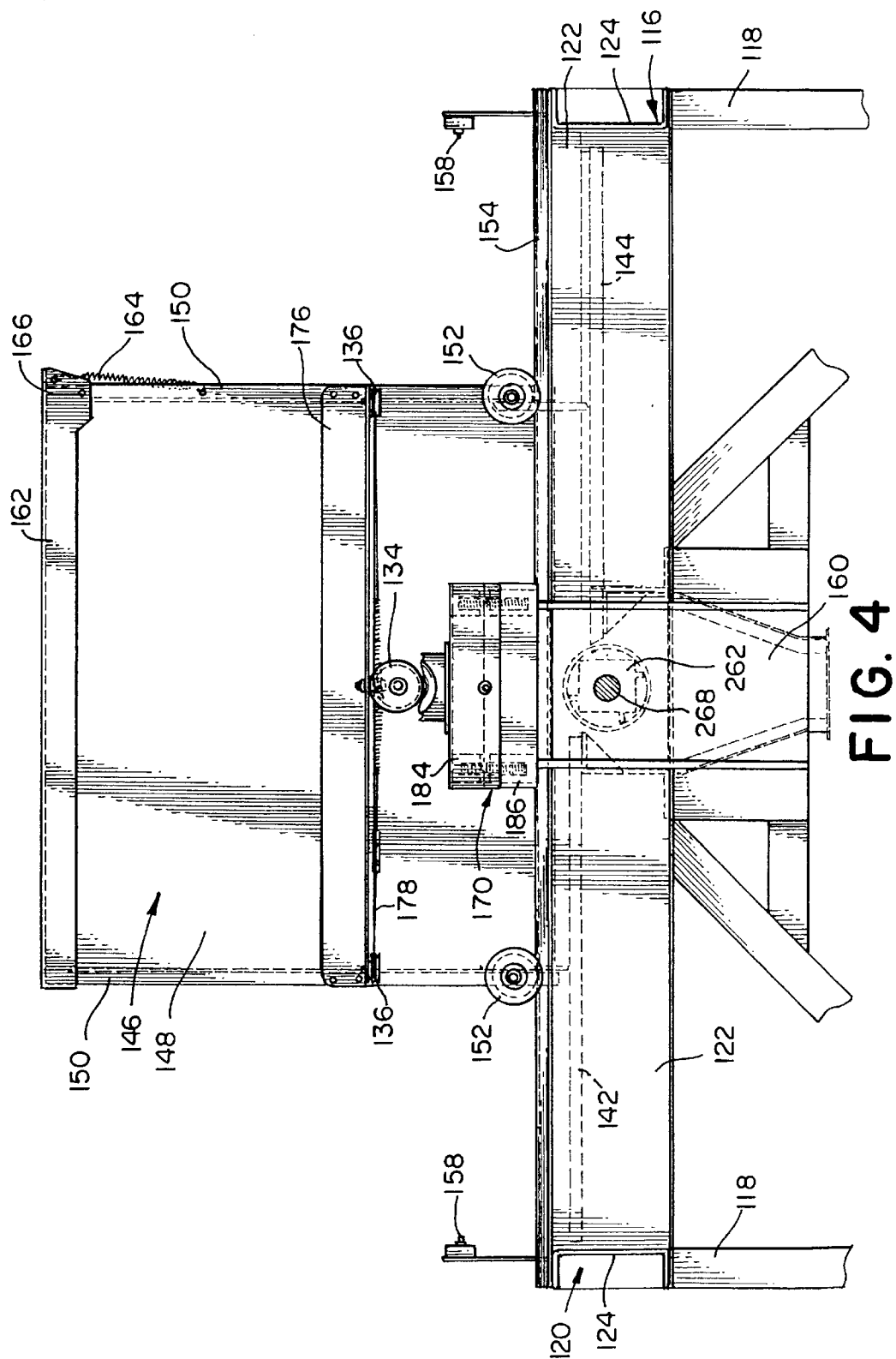
FIG. 4 is a broken front view of the granulator apparatus illustrated in FIG. 1 taken looking in the same direction as FIGS. 2a through 2c, but with two drive motors removed and other parts shown only schematically so as to better illustrate certain aspects of the invention.

As illustrated in FIG. 6, an angular pulley support member 176 is provided affixed to movable hopper box 146. The relative position of angular pulley support 176 on movable hopper box 146 is illustrated in FIGS. 1, 2 and 4. Angular pulley support member 176 supports not only the idler rollers or pulleys 136, but also provides a mounting position for a central bolt 198 to which is affixed turnbuckle 196 and one of the coil springs 194 connected to an end of hopper box drive cable 178 remotely from an end which may be affixed to turnbuckle 196.

In the preferred practice of the invention, the circuitry controlling operation of hopper box drive motor 240 is not only responsive to actuation of hopper box limit switch 158 by movable hopper box 146 to effectuate reversal of hopper box drive motor 240; that circuitry is additionally responsive to rockable housing limit switches 180 and serves to reverse or stop hopper drive motor 240 upon actuation of either of rockable housing limit switches 180. Additionally, this circuitry preferably provides for a time delay upon actuation of one of hopper box limit switches 158 before reversing hopper box drive motor 240. This time delay, which is effectuated upon actuation of one of hopper box limit switches 158, is typically in the neighborhood of about 1 second and greatly reduces wear and risk of burnout of hopper box drive motor 240.

What is claimed is:

1. Apparatus for reducing large pieces of solid plastic material to smaller size for recycling, comprising:
   a. a longitudinally elongated table having transversely displaced upper and lower segments;
   b. a cutter between said upper and lower table segments;
   c. a movable hopper for receiving said large plastic pieces to be size-reduced having an open bottom through which said plastic pieces may contact said table; and
   d. means for supporting and moving said hopper along said upper and lower table segments.

2. The apparatus of claim 1 in which said upper and lower table segments are parallel.

3. The apparatus of claim 1 wherein said cutter rotates about a transverse axis and said hopper moves longitudinally over said table.

4. The apparatus of claim 1 in which said cutter has a plurality of blades mounted on a cylinder extending transversely between upper and lower table segments.

5. The apparatus of claim 1 wherein said blades have cutting edges extending transversely respecting said hopper.

6. The apparatus of claim 1 rectangular box and wherein said apparatus further comprises:
   a. a frame supporting said table and
   b. said means supporting said hopper for movement comprises:
      i. longitudinally extending track connected to said frame for movement of said hopper therealong between positions above said upper and lower table segments; and
      ii. wheel means supporting said hopper and riding in said track.

7. The apparatus of claim 1 wherein said cutter is electrically powered.

8. The apparatus of claim 1 wherein said cutter is pneumatically powered.

9. The apparatus of claim 1 wherein said cutter is hydraulically powered.

10. The apparatus of claim 1 wherein said hopper movement means comprises an electrically driven motor.

11. The apparatus of claim 1 wherein said hopper movement means is pneumatically driven.

12. The apparatus of claim 1 wherein said hopper movement means is hydraulically driven.

13. The apparatus of claim 1 wherein said hopper supporting and moving means further comprises:
   a. means for powering movement of said hopper between said respective positions above said upper and lower table segments; and b. means for reversing direction of said hopper movement powering means upon said hopper reaching a longitudinal travel extremity.

14. The apparatus of claim 13 wherein said hopper power reversing means further comprises means for delaying reversal of said hopper movement powering means for a preselected time upon said hopper reaching a longitudinal travel limit.

15. The apparatus of claim 14 wherein said hopper supporting and moving means further comprises:
   a. means for powering movement of said hopper between said respective positions above said upper and lower table segments; and
   b. means for sensing reduction of hopper movement and stopping said hopper movement powering means in response thereto.

16. The apparatus of claim 13 wherein said hopper supporting and moving means further comprises means for sensing reduction of hopper movement and stopping said hopper movement powering means in response thereto.

17. The apparatus of claim 13 wherein said direction reversing means operates responsively to an electrical signal.

18. The apparatus of claim 13 wherein said direction reversing means operates responsively to a pneumatic signal.

19. The apparatus of claim 13 wherein said direction reversing means operates responsively to an optical signal.

20. Apparatus for reducing large pieces of solid plastic material to smaller size for recycling, comprising:
   a. a longitudinally elongated table having transversely spaced vertically displaced parallel upper and lower segments;
   b. a cutter having a plurality of blades mounted on a cylinder for rotation about a transverse axis between said upper and lower table segments;
   c. means for rotating said cutter;
   d. a movable hopper, receiving said large plastic pieces to be size-reduced, having an open bottom through which said plastic pieces may contact said table;
   e. means supporting said hopper for movement longitudinally between positions over said upper and lower segments of said table;
   f. a frame supporting said table;
   g. a pair of longitudinally extending tracks connected to said frame for movement of said hopper therealong between positions above said upper and lower table segments;
   h. wheels supporting said hopper and riding in said tracks as said hopper moves between said positions above said upper and lower table segments;
   i. means for moving said hopper between said respective positions over said upper and lower table segments;
   j. limit switches located at positions defining extremities of hopper longitudinal travel;
   k. means for reversing direction of said hopper moving means in response to actuation of said limit switches by said hopper at longitudinal extremities of hopper travel above said table; and
   l. power means for delaying reversal of said hopper moving means for a preselected time upon said hopper contacting one of said limit switches.

21. Apparatus for reducing large pieces of solid plastic material to smaller size for recycling, comprising:
   a. a frame;
   b. a first stage shuttle granulating section comprising:
      i. a longitudinally elongated table supported by said frame and having transversely displaced upper and lower segments;
      ii. a cutter mounted for rotation about a transverse axis between said upper and lower table segments;
      iii. means for rotating said cutter;
      iv. a movable hopper for receiving said large plastic pieces to be size-reduced having an open bottom through which said plastic pieces may contact said table;
      v. means supporting said hopper for movement longitudinally between positions over said upper and lower segments of said table;
   c. a second stage radial granulating section comprising:
      i. a motor supported by said frame and oriented with the output shaft skew to vertical;
      ii. a rotor connected to the shaft of said motor for rotation therewith;
      iii. a first plurality of knives connected to said rotor at radial extremities thereof with cutting edges parallel with said motor shaft;
      iv. a base plate having said motor shaft rotatably journaled therewithin;
      v. a second plurality of knives defining a circular array connected to said base plate and upstanding therefrom with cutting edges parallel with said motor shaft and said first plurality of knife cutting edges;
      vi. an aperture ring including notches therein for fitting around said second plurality of knives; and
      vii. means supported by said base plate, positioned radially outboard of said aperture ring and axially substantially aligned therewith, for downwardly deflecting granules of plastic material resulting from cutting action of said first and second pluralities of knives passing through said aperture ring for collection; and
   d. duct means connected to said frame for conveying plastic material granulated in said first stage shuttle section to a locale for downward discharge against said base plate for further granulation by said second granulating stage radial section.

22. The apparatus of claim 21 wherein said hopper is a generally rectangular box and wherein said apparatus further comprises:
   a. a pair of longitudinally extending tracks connected to said frame for movement of said hopper therealong between positions above said upper and lower table segments; and
   b. wheel means supporting said hopper and riding in said tracks as said hopper moves between said positions above said upper and lower table segments.

23. The apparatus of claim 21 wherein said hopper moving means further comprises:
   a. limit switches located at positions defining extremities of hopper longitudinal travel;
   b. means for powering movement of said hopper between said respective positions above said upper and lower table segments; and
   c. means for reversing direction of said hopper movement powering means in response to actuation of said limit switches by said hopper at longitudinal extremities of hopper travel above said table.

24. The apparatus of claim 23 wherein said hopper power reversing means further comprises means for delaying reversal of said hopper movement powering means for a preselected time upon said hopper contacting one of said limit switches.

25. Apparatus for reducing size of solid plastic material for recycling, comprising:
   a. a frame;
   b. a first granulating section, comprising:
      i. a table supported by said frame and having transversely displaced upper and lower segments,
      ii. a cutter connected to said frame for rotation adjacent a segment of said table,
      iii. a movable hopper connected to said frame for receiving said plastic material to be size-reduced, having a bottom opening through which said plastic may contact said table and said cutter and said hopper moves thereover,
      iv. means for moving said hopper over said table and said cutter,
   c. a second granulating section, comprising:
      i. a rotatable rotor,
      ii. at least one knife connected to said rotor at a radial extremity thereof with a cutting edge parallel with an axis about which said rotor rotates,
      iii. a plate connected to said frame having a motor shaft on which said rotor rotates journaled therewith,
      iv. at least one second knife connected to said plate and upstanding therefrom with a cutting edge parallel with said shaft and cutting edges with said knifes connected to said rotors,
      v. an apertured ring including notches therein for fitting around said knives connected to said plate, and
      vi. means supported by said plate output of said apertured ring for downwardly deflecting for collection granules of plastic material passing through said aperture ring due to cutting action of said knives, and
   d. means connected to said frame for conveying plastic material granulating in said first stage section 2, said plate for further size reduction by said second granulating section.

26. Apparatus for reducing large pieces of solid plastic material to smaller size for recycling, comprising:
   a. transversely displaced upper and lower segments;
   b. a cutter between said upper and lower segments;
   c. a movable hopper for receiving said large plastic pieces to be size-reduced, having an open bottom through which said plastic pieces may contact said segments and said cutter during hopper passage thereover; and
   d. means for supporting and moving said hopper between positions over said upper and lower segments and said cutter.

27. A method for granulating previously molded and/or waste solid thermoplastic material for recycling, comprising:
   a. introducing said previously molded and/or waste solid thermoplastic material into a laterally bounded granulating zone;
   b. providing cutting means proximate the bottom of said granulating zone; and
   c. sweeping said previously molded and/or waste thermoplastic material within said granulating zone across said cutting means by moving said lateral boundary over said cutting means while permitting cut portions of said previously molded and/or waste solid thermoplastic material to pass between said cutting means and a surface defining a bottom portion of said laterally-bounded granulating zone;
   d. collecting said cut portions of said previously molded and/or waste solid thermoplastic material passing between said cutting means and said surface defining said portion of said laterally bounded granulating zone;
   e. introducing said collected material into a cylindrical granulating zone via a cylinder end;
   f. providing at least one stationary knife, having length less than one-quarter of the diameter of the cylindrical granulating zone, at a cylindrical boundary of said cylindrical granulating zone;
   g. moving at least one second knife, having length substantially that of said stationary knife, along said cylindrical boundary of said granulating zone to pass in proximity to said stationary knife and thereby trap portions of said material between said stationary and moving knives for further cutting thereby into smaller granules;
   h. providing an apertured service as a portion of said cylindrical boundary;
   i. sweeping portions of said previously cut material along said apertured service with said moving cutting knife thereby causing said previously cut material having granule size less than that of said apertures to pass therethrough for recycling.

28. A method for granulating previously molded and/or waste solid thermoplastic material for recycling through additional molding, comprising:
   a. introducing said previously molded and/or waste solid thermoplastic material into a movable rectangular parallelepiped-shaped hopper defining a granulating zone;
   b. providing rotating cutting means positioned immovably with respect to said hopper at the bottom of said cutting zone;
   c. moving said hopper from above a first hopper bottom closure past said cutting means to above a second hopper bottom closure thereby exposing said previously molded and/or waste solid thermoplastic material within said hopper to said cutting means and permitting cut portions of said previously molded and/or waste solid thermoplastic material to fall between said cutting means and one of said hopper bottom closure portions;
   d. channeling cut material passing between said cutting means and said hopper bottom closure downwardly into a cylindrical granulating zone in an axial direction;
   e. providing at least one stationary knife having length less than one-quarter of the diameter of said cylindrical granulating zone at a cylindrical boundary of said cylindrical granulating zone;
   f. moving at least one second knife along said cylindrical boundary of said granulating zone to pass in proximity to said stationary knife and thereby trap portions of said material between said stationary and moving knives for cutting thereby into smaller granules;
   g. providing an apertured service as a portion of said cylindrical boundary; and
   h. sweeping said granular material along said apertured service with said moving cutting knife thereby causing cut granules of said material having size less than that of said apertures to pass therethrough for recycling via subsequent molding.

29. The method of claim 28 further comprising the step of moving said knife blades at an angle of about 80° to said apertured ring interior annular surface.

30. The method of claim 29 wherein said moving step further comprises orienting said second knife with a knife cutting edge parallel with the axis of said cylinder defined by said granulating zone and moving said knife circumferentially around the cylindrical boundary of the granulating zone to pass in proximity to the stationary knife and thereby trap portions of previously granulated material between the stationary and moving knives for cutting thereby into small granules.

31. An apparatus for reducing plastic material to smaller size for recycling, comprising:
   a. longitudinally and vertically displaced upper and lower segments;
   b. a cutter having a rotational axis, the rotational axis positioned between the longitudinally and vertically displaced upper and lower segments; and
   c. a movable hopper for introducing the plastic material to the cutter, the hopper having an open bottom through which the plastic material contacts the upper segment, the lower segment and the cutter; wherein the movable hopper slides the plastic material along the lower segment and into contact with the cutter to reduce the plastic material to smaller size.

32. A method for reducing plastic material to smaller size for recycling, comprising:
   a. introducing the plastic material into a movable hopper having an open bottom; and
   b. longitudinally moving the hopper to allow the plastic material to contact, through the open bottom, an upper segment, a lower segment and a cutter, the cutter positioned between a longitudinal and vertical displacement between the upper segment and the lower segment, wherein movement of the hopper slides the plastic material along the lower segment and into contact with the cutter to reduce the plastic material to smaller size.

* * * * *

UNITED STATES PATENT AND TRADEMARK OFFICE
CERTIFICATE OF CORRECTION

PATENT NO.    : 6,405,949 B1
DATED         : June 18, 2002
INVENTOR(S)   : Stephen B. Maguire It is certified that error appears in the above-identified patent and that said Letters Patent is hereby corrected as shown below:

<u>Title page,</u>
Item [60], Related U.S. Application Data, insert -- Provisional application No. 60/106,012 filed October 28, 1998 and pending Serial No. 09/259,156 filed February 26, 1999 --.

Signed and Sealed this

Twenty-seventh Day of May, 2003

JAMES E. ROGAN
*Director of the United States Patent and Trademark Office*